(12) United States Patent
Moll et al.

(10) Patent No.: US 9,754,399 B2
(45) Date of Patent: Sep. 5, 2017

(54) CUSTOMIZED AUGMENTED REALITY ANIMATION GENERATOR

(71) Applicant: CRAYOLA, LLC, Easton, PA (US)

(72) Inventors: Joseph Thomas Moll, Bethlehem, PA (US); Brian Edward Nemeckay, Belvidere, NJ (US)

(73) Assignee: Crayola, LLC, Easton, PA (US)

( * ) Notice: Subject to any disclaimer, the term of this patent is extended or adjusted under 35 U.S.C. 154(b) by 0 days.

(21) Appl. No.: 14/802,820

(22) Filed: Jul. 17, 2015

(65) Prior Publication Data

US 2016/0019709 A1    Jan. 21, 2016

Related U.S. Application Data

(60) Provisional application No. 62/025,916, filed on Jul. 17, 2014.

(51) Int. Cl.
| | |
|---|---|
| *G09G 5/02* | (2006.01) |
| *G06T 13/20* | (2011.01) |
| *G06T 1/00* | (2006.01) |
| *G06T 11/00* | (2006.01) |
| *G06T 13/40* | (2011.01) |
| *G06T 13/80* | (2011.01) |
| *G06F 3/048* | (2013.01) |
| *G06F 3/14* | (2006.01) |

(52) U.S. Cl.
CPC ............ *G06T 13/20* (2013.01); *G06T 1/0007* (2013.01); *G06T 11/001* (2013.01); *G06T 13/40* (2013.01); *G06T 13/80* (2013.01); *G06T 2210/44* (2013.01)

(58) Field of Classification Search
CPC combination set(s) only.
See application file for complete search history.

(56) References Cited

U.S. PATENT DOCUMENTS

| | | | |
|---|---|---|---|
| 8,963,926 | B2 | 2/2015 | Brown et al. |
| 9,196,076 | B1 | 11/2015 | MacLeod |
| 2004/0227761 | A1 | 11/2004 | Anderson et al. |
| 2006/0274070 | A1 | 12/2006 | Herman et al. |
| 2007/0035547 | A1 | 2/2007 | Anderson et al. |
| 2010/0231692 | A1 | 9/2010 | Perlman et al. |
| 2011/0064388 | A1 | 3/2011 | Brown et al. |
| 2013/0278607 | A1 | 10/2013 | Twigg et al. |

(Continued)

OTHER PUBLICATIONS

Non-Final Office Action dated Mar. 24, 2017 in U.S. Appl. No. 14/802,813, 23 pages.

*Primary Examiner* — Wesner Sajous
(74) *Attorney, Agent, or Firm* — Shook, Hardy & Bacon L.L.P.

(57) ABSTRACT

Embodiments of the invention are directed an animation kit including a template page with at least one template design, an armature that moves between at least a first position and a second position, and an animation application that generates an animated segment corresponding to the template design and at least one pose of the armature. In further embodiments, a method for generating an animated segment is provided. In another embodiment, a system for generating an animated sequence includes a template design and an application that receives an image of the template design and animates at least one three-dimensional image corresponding to the captured template design.

20 Claims, 25 Drawing Sheets

(56) References Cited

U.S. PATENT DOCUMENTS

| | | | |
|---|---|---|---|
| 2014/0063316 A1* | 3/2014 | Lee | H04N 5/23293 |
| | | | 348/333.02 |
| 2014/0267310 A1* | 9/2014 | Moll | G06T 13/20 |
| | | | 345/473 |
| 2015/0163399 A1* | 6/2015 | Beaurepaire | H04N 5/23229 |
| | | | 348/222.1 |
| 2015/0262422 A1* | 9/2015 | Znamenskiy | G06T 7/0065 |
| | | | 345/420 |
| 2015/0331888 A1 | 11/2015 | Shomair | |
| 2016/0275712 A1* | 9/2016 | Moll | G06T 13/40 |

\* cited by examiner

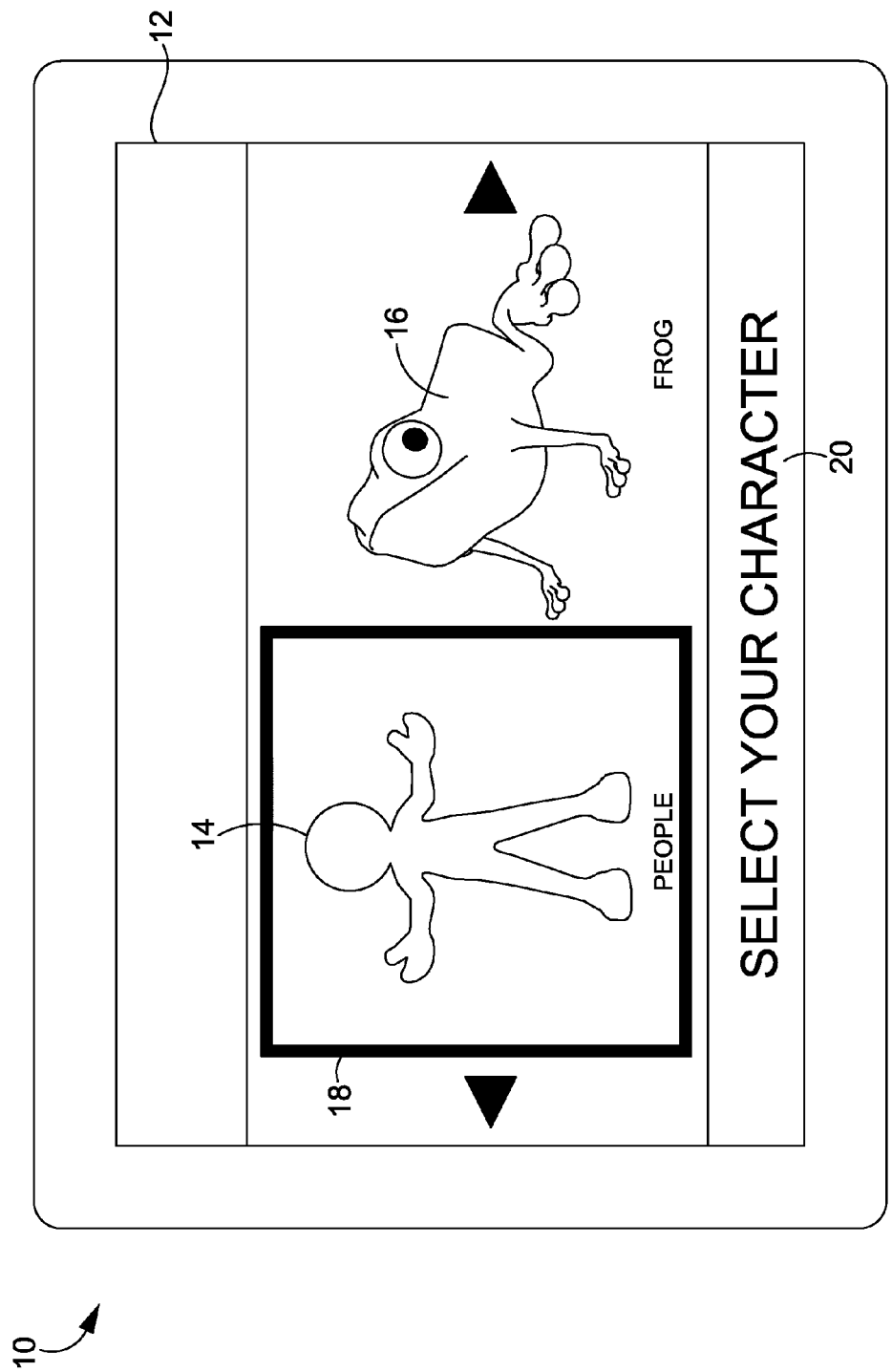

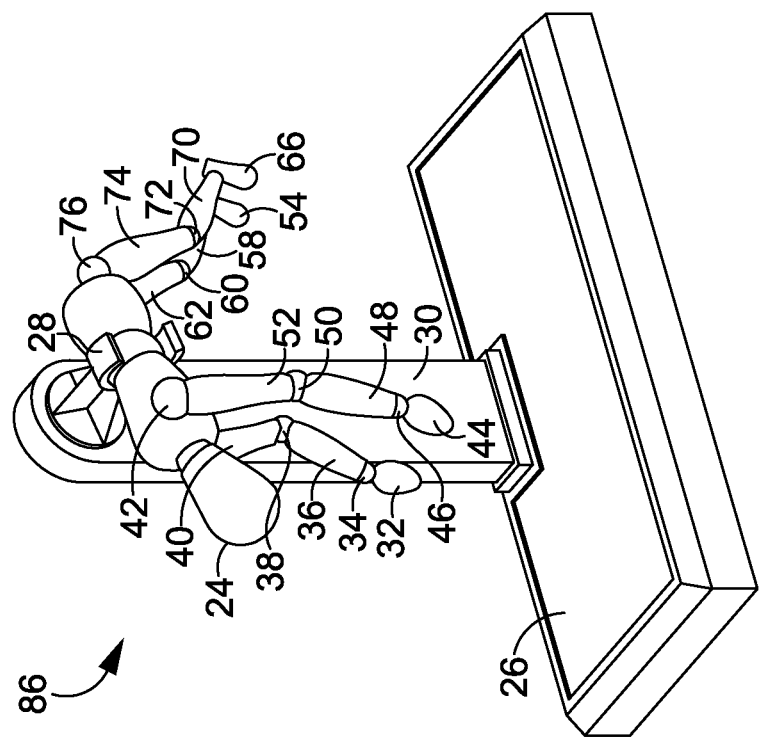
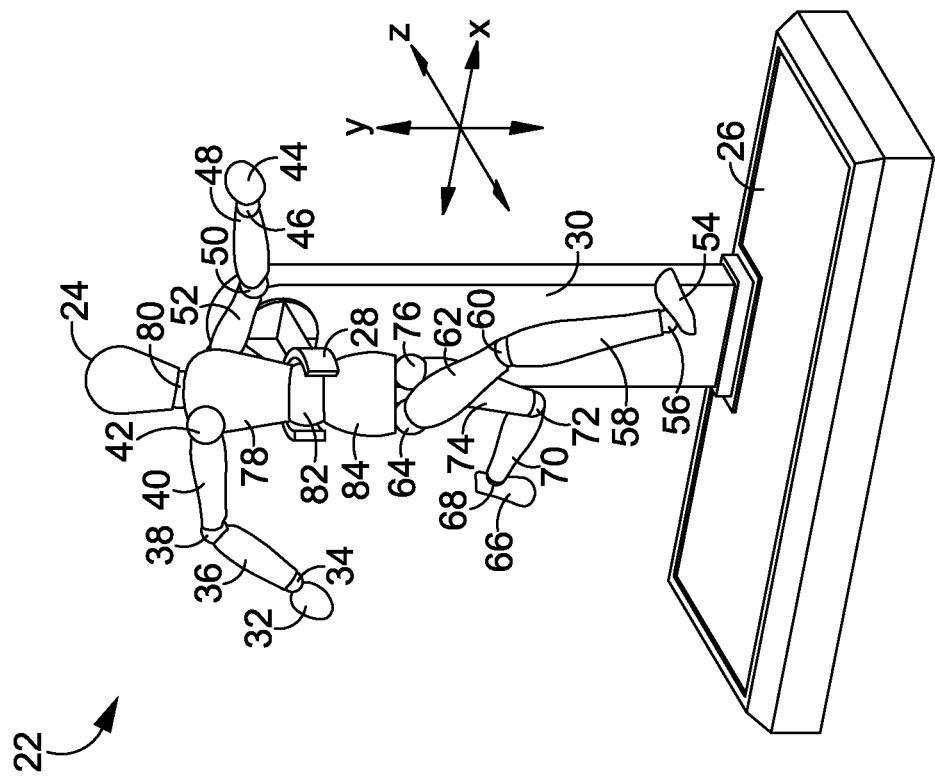

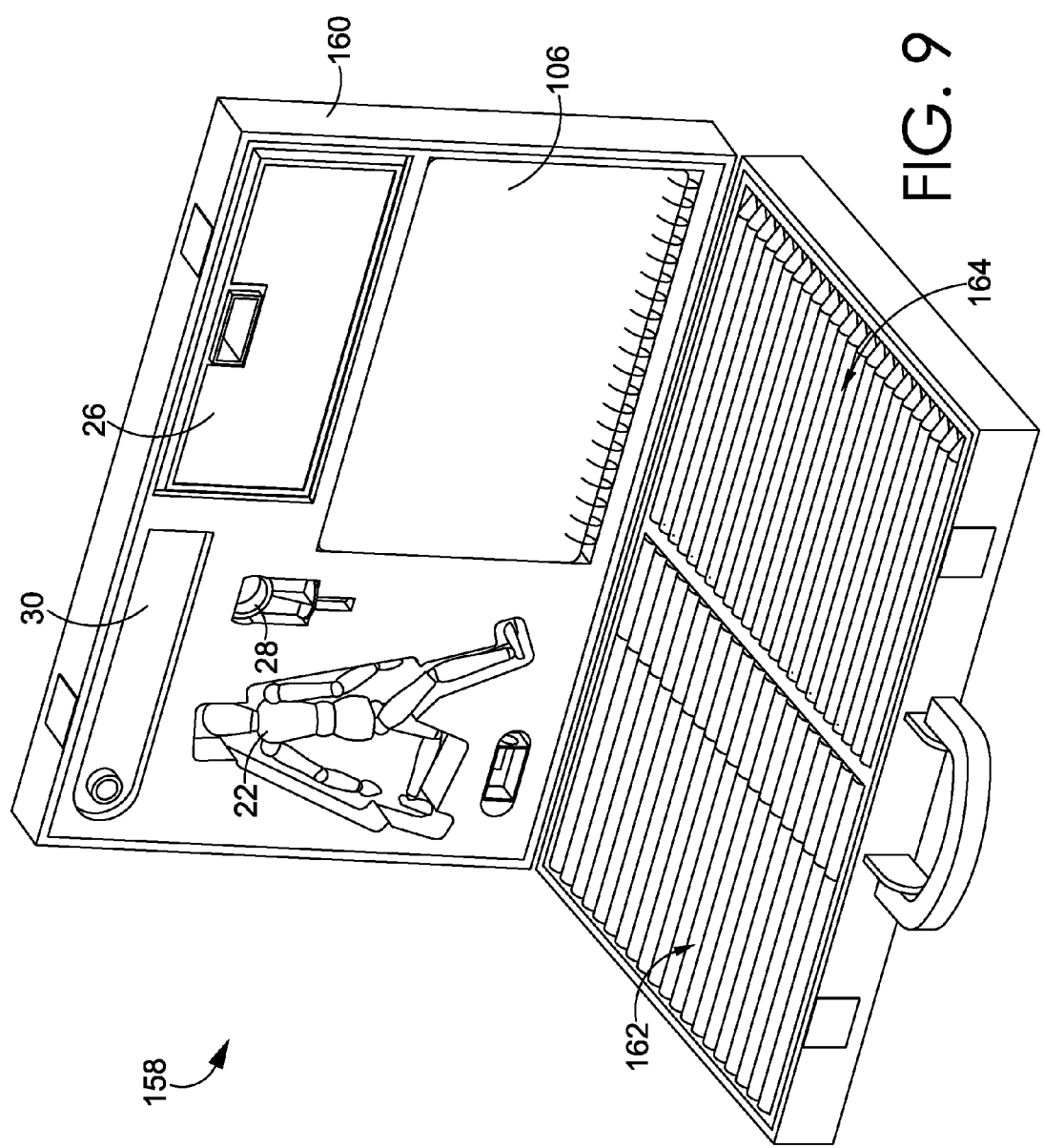

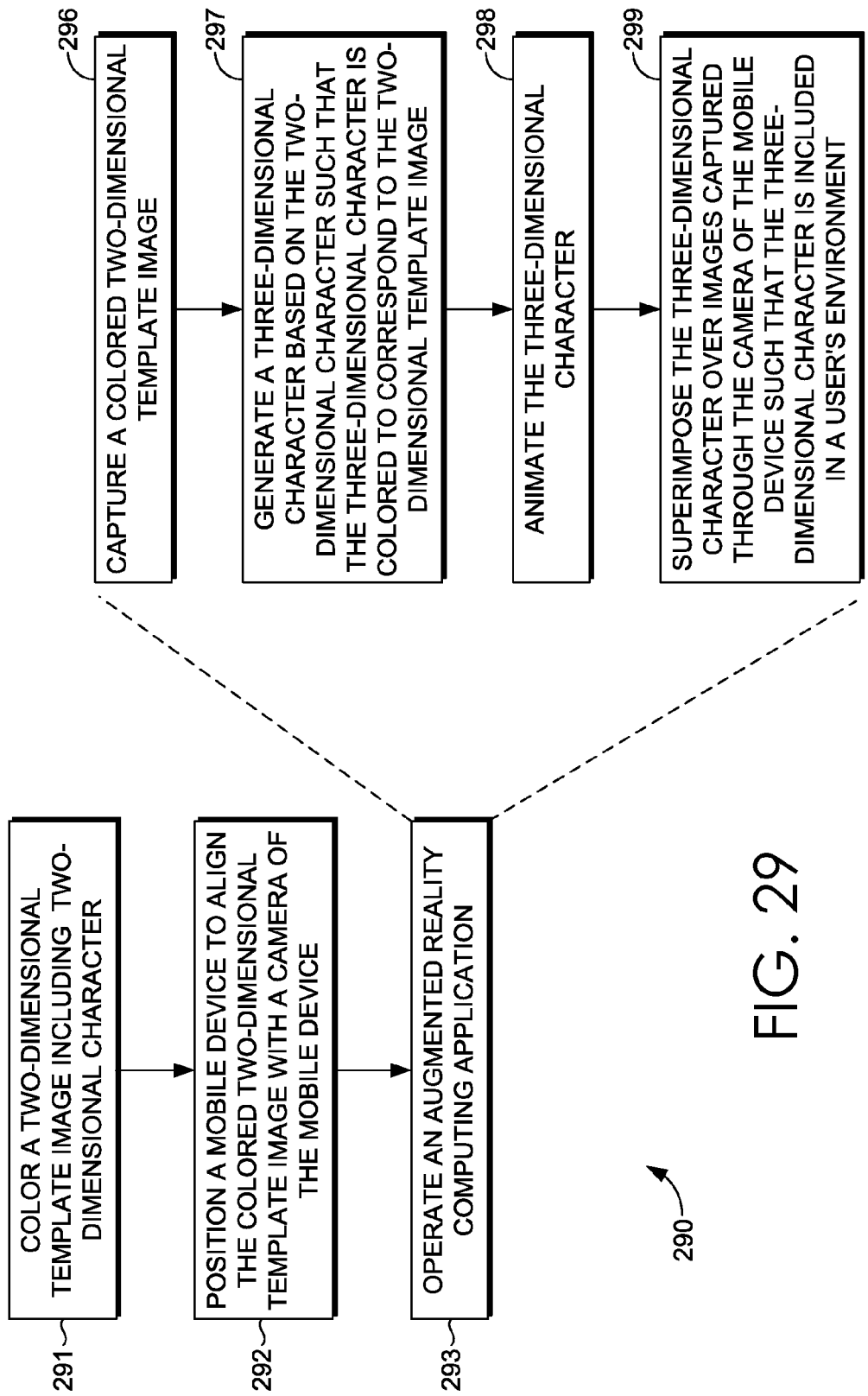

CUSTOMIZED AUGMENTED REALITY ANIMATION GENERATOR

CROSS-REFERENCE TO RELATED APPLICATIONS

This application claims priority to U.S. Provisional Application No. 62/025,916, filed Jul. 17, 2014, entitled "Design Pro Easy Motion Animator," the entire contents of which are hereby incorporated by reference. This application is also related by subject matter to U.S. application Ser. No. 14/802,813, entitled "Armature and Character Template for Motion Animation Sequence Generation," filed on the same day as this application, which is hereby incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed description section below. This summary is not intended to identify key features or essential features of the claimed subject matter, nor is it intended to be used as an aid in isolation to determine the scope of the claimed subject matter.

In brief and at a high level, this disclosure describes, among other things, a motion capture method for creating computer-generated special effects. In some embodiments, the invention includes a three-dimensional (3-D) armature that is positioned into one or more poses for capture by a computing device. In further embodiments, a template image on a two-dimensional (2-D) drawing surface is configured to be scanned by a camera on a computing device so that the template image colored by a user may be captured. Upon capturing an image of the colored-in template using a camera associated with the computing device, an application associated with the computing device is configured to associate one or more portions of the captured image with one or more digital templates corresponding to the drawn template image, according to embodiments of the invention. Additionally, the captured image may be applied to one or more digital templates during an animation sequence prepared by the user and/or the application and corresponding to one or more armature poses captured by the computing device camera.

In one aspect of the invention, the application associated with the computing device is configured to automatically capture an image of the colored-in template image and/or automatically apply at least a portion of the captured image to at least a portion of a 3-D digital template for animation. Based on user interaction with one or more of the armature, the template image, and the application, the application may be used to generate a 3-D animation sequence. In still further embodiments, a kit is provided that includes at least one armature for manipulation by a user and at least one template image for coloring in by a user, where the armature and/or template image correspond to a digital template on an application configured to interact with the armature and template to provide an animation sequence. As such, in response to a received image of a colored template page and received images of one or more poses of the armature, a corresponding animation sequence including the colored features and character/armature poses applied to a corresponding digital template is generated according to embodiments of the invention. In one aspect, the animation sequence may be based on the captured armature poses as augmented in association with one or more automatically generated animation poses, such as a transitional pose between two user-provided poses of the armature.

In another aspect, a kit may be provided that includes at least one 2-D template image that corresponds to a 3-D digital animation template for automated animation without user-provided armature content. For example, at least one 2-D template page corresponding to at least one 3-D template may be provided in a kit with instructions for automated generation of an animated sequence that includes user-drawn content on the 2-D template. In one embodiment of the invention, a user may color the 2-D template and capture an image of the colored 2-D template on a computing device executing an animation sequence application, for further interaction as a 3-D animation automatically provided based on the pairing of the 2-D template page and the 3-D digital template.

Further embodiments of the invention are directed to a 2-D drawing template for capture by a computing device. In embodiments, an application executed by the computing device is configured to receive a captured image of a colored, 2-D template and generate a 3-D image of a portion of the 2-D drawing template. In further embodiments, an application-generated 3-D image may be superimposed on a user environment viewed by the computing device, such that a portion of the user-colored 2-D drawing template becomes animated in the context of the viewed user environment. In further embodiments, at least a portion of the captured image of the 2-D drawing template may be animated for interaction and/or viewing from multiple perspectives within a 3-D animation environment including one or more portions of the user environment viewed by the computing device.

DESCRIPTION OF THE DRAWINGS

Illustrative embodiments of the invention are described in detail below with reference to the attached drawing figures, and wherein:

FIG. 1 is an exemplary interface for generating an animated segment, in accordance with an embodiment of the invention;

FIGS. 2A-2B are exemplary armatures for generating an animated segment, in accordance with an embodiment of the invention;

FIG. 9 is an exemplary kit for generating an animated segment, in accordance with an embodiment of the invention;

FIG. 29 is a flow chart of an exemplary method of generating a customized 3-D animation, in accordance with an embodiment of the invention.

DETAILED DESCRIPTION

Figure 3:
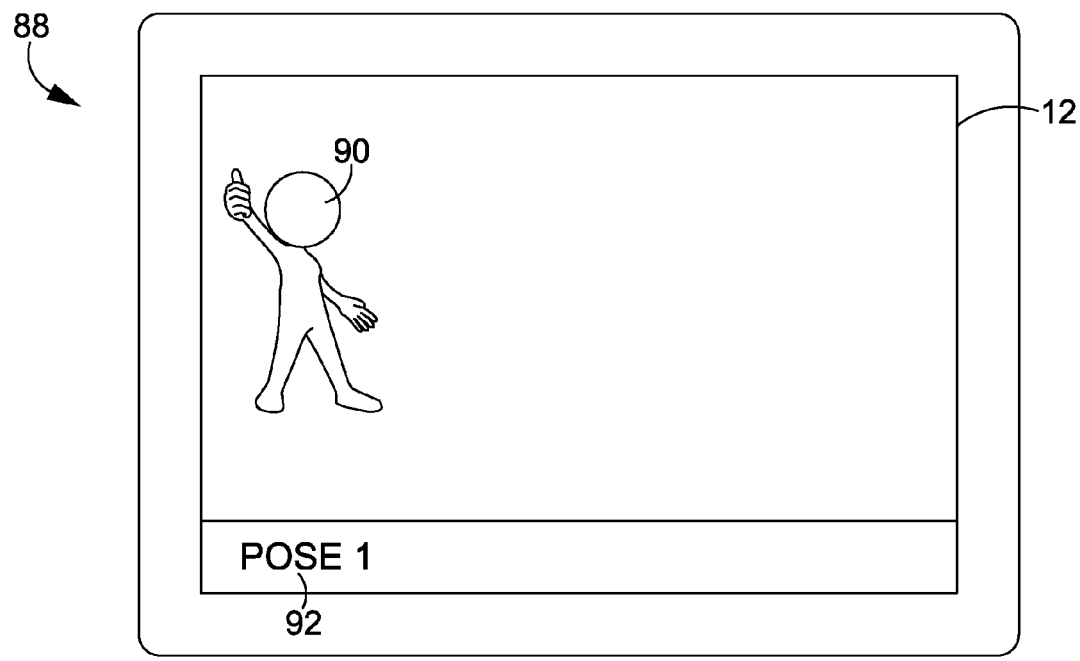
FIG. 3 is an exemplary interface for generating an animated segment, with a first manual pose of an armature captured by the computing device, in accordance with an embodiment of the invention.

The subject matter of embodiments of the invention is described with specificity herein to meet statutory requirements. The description itself is not intended to necessarily limit the scope of claims, and the claimed subject matter might be embodied in other ways to include different steps or combinations of steps similar to the ones described in this document, in conjunction with other present or future technologies. Terms should not be interpreted as implying any particular order among or between various steps unless and except when the order of individual steps is explicitly described.

Embodiments of the invention include a motion capture method for creating computer-generated special effects. In some embodiments, the invention includes a three-dimensional (3-D) armature that is positioned into one or more poses for capture by a computing device. In further embodiments, a template image on a two-dimensional (2-D) drawing surface is configured to be scanned by a camera on a computing device so that the template image colored by a user may be automatically captured. Upon automatically capturing an image of the colored-in template using a camera associated with the computing device, an application associated with the computing device is configured to associate one or more portions of the captured image with one or more digital templates corresponding to the drawn template image, according to embodiments of the invention. Additionally, the captured image may be applied to one or more digital templates during an animation sequence prepared by the user and/or the application and corresponding to one or more armature poses captured by the computing device camera.

In one aspect of the invention, the application associated with the computing device is configured to automatically capture an image of the colored-in template image and/or automatically apply at least a portion of the captured image to at least a portion of a 3-D digital template for animation. Based on user interaction with one or more of the armature, the template image, and the application, the application may be used to generate a 3-D animation sequence. In still further embodiments, a kit is provided that includes at least one armature for manipulation by a user and at least one template image for coloring in by a user, where the armature and/or template image correspond to a digital template on an application configured to interact with the armature and template to provide an animation sequence. As such, in response to a received image of a colored template page and received images of one or more poses of the armature, a corresponding animation sequence including the colored features and character/armature poses applied to a corresponding digital template is generated according to embodiments of the invention. In one aspect, the animation sequence may be based on the captured armature poses as augmented in association with one or more automatically generated animation poses, such as a transitional pose between two user-provided poses of the armature.

In another aspect, a kit may be provided that includes at least one 2-D template image that corresponds to a 3-D digital animation template for automated animation without user-provided armature content. For example, at least one 2-D template page corresponding to at least one 3-D template may be provided in a kit with instructions for automated generation of an animated sequence that includes user-drawn content on the 2-D template. In one embodiment of the invention, a user may color the 2-D template and capture an image of the colored 2-D template on a computing device executing an animation sequence application, for further interaction as a 3-D animation automatically provided based on the pairing of the 2-D template page and the 3-D digital template.

Further embodiments of the invention are directed to a 2-D drawing template for capture by a computing device. In embodiments, an application executed by the computing device is configured to receive a captured image of a colored, 2-D template and generate a 3-D image of at least a portion of the 2-D drawing template. In further embodiments, an application-generated 3-D image may be superimposed on a user environment viewed by the computing device, such that a portion of the user-colored 2-D drawing template becomes animated in the context of the viewed user environment. In further embodiments, at least a portion of the captured image of the 2-D drawing template may be animated for interaction and/or viewing from multiple perspectives within a 3-D animation environment including one or more portions of the user environment viewed by the computing device.

In some embodiments of the invention, an assortment of different 3-D characters (e.g., people, animals, plants, or other characters available through in-application purchases) are provided within the 3-D application. These various characters may be able to be positioned in any desired pose by a user. Using the supplied poseable armature the user may direct the positioning of the body and limbs of the selected character according to an embodiment of the invention. Further, the stand may grab and/or secure around a particular portion of the figure armature to provide the most versatile ways of posing the armature, such as securing the armature around a middle portion of the body. In some embodiments, the application ("app") software is configured to match the position of the armature to the character. Further, the app software may be configured to determine the position of the armature by a series of glyph labels located on the different parts of the armature, such as a first glyph label indicating a first limb of the armature and a second glyph label indicating a second limb of the armature. The app software may further be configured to use the computing device camera to locate and/or identify one or more of the glyphs, and their position with respect to the armature, and apply these coordinates to the 3D character on the computing device screen.

In some embodiments of the invention, a user may provide an indication to the computing device that the user is satisfied with the position of their character (e.g., touching the screen, covering a glyph on the stand of the armature, etc.). In response to such indication, the user may then proceed to position the armature into the next major positions that will be needed for the animation sequence using the same above process. In one aspect, using the app software, the user may determine how many animated frames they want between these major positions and the app may then automatically generate these in-between frames to complete the full animation. For example, if the app captures images of two user-generated poses, and then the user indicates that four frames are desired between the two user poses, the app may automatically generate an animation including, at least, the six frames of animation (i.e., two frames from the user with four frames that are app-generated in between). In a further embodiment, if the animation does not look the way the user desires, they may reposition any of the major positions for replacing, such as repositioning the armature to provide an updated, major position of the character. In another example, if the animation is undesirable to a user, the user may select and/or grab one or more app generated frames and create a new major position to make the animation flow more smoothly.

According to embodiments of the invention, using the supplied coloring templates a user may apply color and/or graphics to their character used in the animation. As such, in some embodiments, the template may be colored and the computing device camera may be used to apply the artwork from the template to the 3-D character. For additional 3-D characters bought through the app, in some embodiments, the corresponding coloring templates may be downloadable for the user to print and color. Additionally, a user may also download and print additional coloring templates for the characters that come with the original purchase.

In some embodiments of the invention, the templates may also include some environment scenes that the user can color. These environmental scenes may include one or more items of content for integrating with an animated character. For example, the environmental scenes may have predetermined animations applied to them that can be place behind the animated character (e.g., a jungle scene that has moving trees, water, animals, etc.). In some embodiments, through the software, these animated environments may be tiled if the character animation requires more space than the given scene. For example, in one embodiment, if the character goes out of the scene in either the left or right direction, the current background environmental scene may be copied and placed in that direction alongside of the current scene creating a larger seamless background for providing ongoing animation activity. In another example, if the character comes toward or away from the camera it may provide a similar effect by duplicating the current environment and placing it either in front of or behind the current scene, creating depth to the current scene in a seamless backdrop while incorporating animated features of a selected background and/or user-colored features of a template environment.

In addition to being able to customize the appearance of your character and the environment with the coloring templates (i.e., initially provided coloring templates included in a kit and/or subsequently downloaded and printed templates the user later retrieves), in some embodiments of the invention, the user may add accessories to the character through the app. In further embodiments, the user may utilize the app to drag and drop accessories onto their 3-D character. For example, if the user is making a safari person, they may add a 3-D hat, camera, etc. or on a scuba diver, the user may add goggles, a snorkel, and swim fins to add more detail to the animation.

In one embodiment of the invention, a mode in the application allows the user to draw a path on the screen through or on the background environment that the user created animation will follow. In one example, if the user created an animation of a figure running, in this mode the user may view the scene from the top and create a curved path that the character animation will follow rather than him just running in a straight line. As such, a user may manipulate in-animation motion of the character as well as pre-animation motion via the armature positioning.

In some embodiments of the invention, the user may record the completed animation and save it to a file or stop the animation at any frame and take a still photograph of the screen. In a further embodiment, the user may make their own movie poster associated with the content of their animated segment. Further, the user may add title frames and credit frames at the beginning and/or end if they want, for their big production.

In further embodiments, an animation sequence may be made that adds sound, and has a sound element having the character speak works that the user applies to the character. In one example, the person may talk into their device and the cat or animal on the screen may mouth moves saying the same thing the user said. In another embodiment, since the character being created and decorated is a 3-D file, the user may pose this character they have created into any pose they want. In further embodiments, the user may generate a two-dimensional or three-dimensional associated with the character they created.

In another embodiment of the invention, an application may be used to generate a printable glyph that when it is viewed thru a device, an augmented reality version of the character will pop up on the screen for you and your friends to view and share. In another embodiment, still images from the animation may be used to create trading cards and with the printable glyph as part of the trading card, provide a card having a character that pops off the card into an augmented reality image when viewed from a device.

In one embodiment of the invention, a character is selected from a premade template to create a "cast" for an animated clip and/or segment. Further, motion may be created to correspond with the selected character, based on posing of an armature in a basic position that the user wants to watch the character move, such that based on the position of the armature, the application is configured to create one or more corresponding transition poses.

In further embodiments of the invention, a user may create a particular scene for an animated sequence, based on coloring a template to create a character and background photograph page using the application. In further embodiments, a user may select one or more accessories to associate with the character. Further, the animation may be viewed by providing an indication to the application, such as by pressing a "play" button, upon which the motion begins and one or more created sound effects, or sound effects chosen from a library of provided sounds, may be applied to the animation sequence.

With reference now to the figures, an exemplary an exemplary animation interface 10 for generating an animated segment is provided in FIG. 1, in accordance with an embodiment of the invention. The animation interface 10 includes a display 12 that depicts characters for animation by a user. In this example, the display 12 includes a first character 14, a second character 16, a selection indicator 18, and a user prompt 20. In embodiments of the invention, the animation interface 10 may be a display 12 of a computing device executing an animation application that identifies one or more characters for animation by a user. For example, the user may select between the first character 14 and the second character 16 for applying one or more poses by an armature and one or more colorings from a colored template sheet, as discussed further below. In some embodiments, an initial selection via the animation interface 10 may determine whether the poses received by the computing device are directed to a person character structure, an animal character structure, or some other entity structure for activation, coloring, posing, and animation.

In FIG. 1, the selection indicator 18 provides an indication of selecting the person provided by the first character 14. According to further aspects of the invention, as shown in FIGS. 2A-2B, the user may then utilize an armature for posing the selected character from FIG. 1, such as the exemplary armature 22 in a first pose of FIG. 2A for generating an animated segment, in accordance with an embodiment of the invention. In embodiments, an armature for animation may include one or more poseable features for manipulation by a user. In the example of FIG. 2A, the exemplary armature 22 includes an armature in a first position that is secured by a stand base 26, a stand arm 30, and an armature attachment device 28 that secures the armature 22 in one or more positions as desired by a user. Additionally, the armature 22 includes a head 24, a right hand 32, joint 34, lower arm 36, joint 38, upper arm 40, joint 42, left hand 44, joint 46, lower arm 48, joint 50, upper arm 52, right foot 54, joint 56, lower leg 58, joint 60, upper leg 62, joint 64, left foot 66, joint 68, lower leg 70, joint 72, upper leg 74, joint 76, upper body 78, neck 80, waist 82, and lower body 84. As shown in the example of FIG. 2A, the right hand 32 and related features are posed in a back position opposite the front direction of posing of the left hand 44. Further, the right foot 54 is posed in a front position opposite the back direction of posing of the left foot 66. In embodiments of the invention, the armature 22 may be posed in multiple different positions based on user manipulation of one or more portions of the armature 22, such as manipulation of one or more upper or lower arm portions, leg portions body portions and/or corresponding joints of the armature 22 that provide a user-desired position for generating an animation. In one example of animation using the armature 22, the position of FIG. 2A, and one of more additional user-generated poses of the armature 22, may correspond to poses for the animation of the first character 14, such as a person.

In FIG. 2B, the exemplary armature 86 in a second position includes rotation of the armature attachment device 28 to secure the armature 86 with each limb in a downward position. In this example, animation using the armature 86, the position of FIG. 2B, and one or more additional user-generated poses of the armature 86, may correspond to poses for the animation of the second character 16, such as an animal (e.g., a frog). As such, in some embodiments, a single armature structure may be used for posing that corresponds to human or other character animations.

Figure 4:
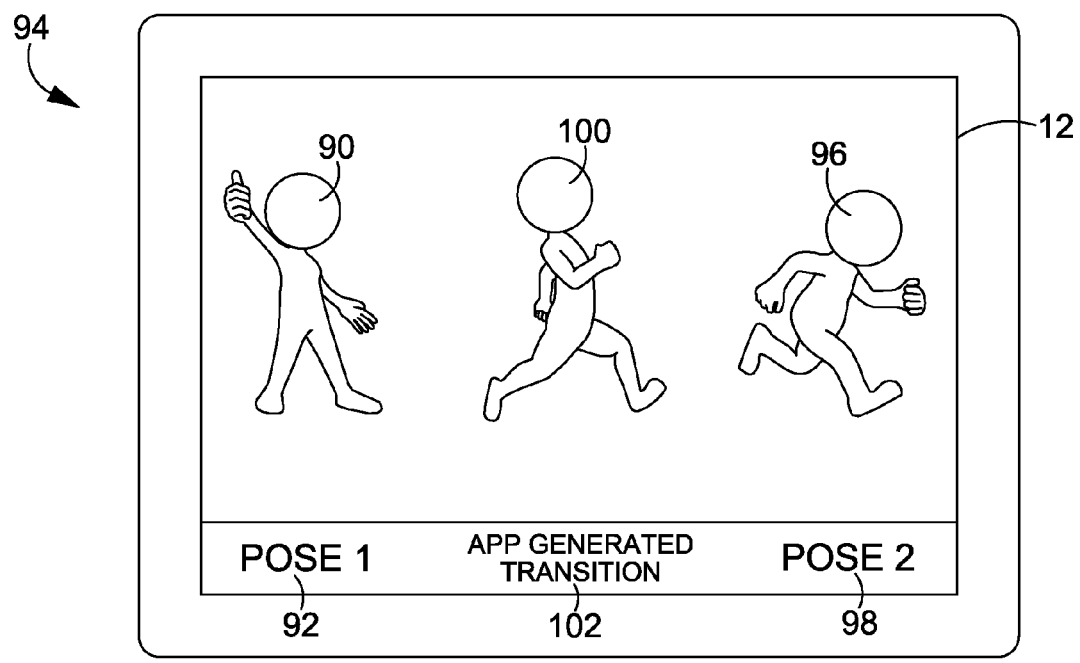
FIG. 4 is an exemplary interface for generating an animated segment, with first and second manual poses of an armature captured by the computing device and an application-generated transition pose.

In FIG. 3, an exemplary animation interface 88 with a first manual pose of an armature captured by the computing device is provided for generating an animated segment according to an embodiment of the invention. The display 12 includes a first pose 90 with indicator 92. In one embodiment, a user may position an armature in a first manual pose based on manipulation of one or more parts of the armature, which may then be captured by the camera of the computing device to provide the captured first pose 90 shown on display 12. In the animation interface 94 of FIG. 4, the user may then provide a second pose 96 of the manually manipulated armature, as associated with indicator 98. Accordingly, an application executed by the computing device utilized with the animation interface 94 may generate a transition pose 100, with indicator 102. Such intermediate and/or transitional pose characteristics of the transition pose 100 may correspond to both the first pose 90 and the second pose 96 such that the resulting animation includes one or more frames necessary to manipulate the character from the first pose 90 to the second pose 96.

Figure 5:
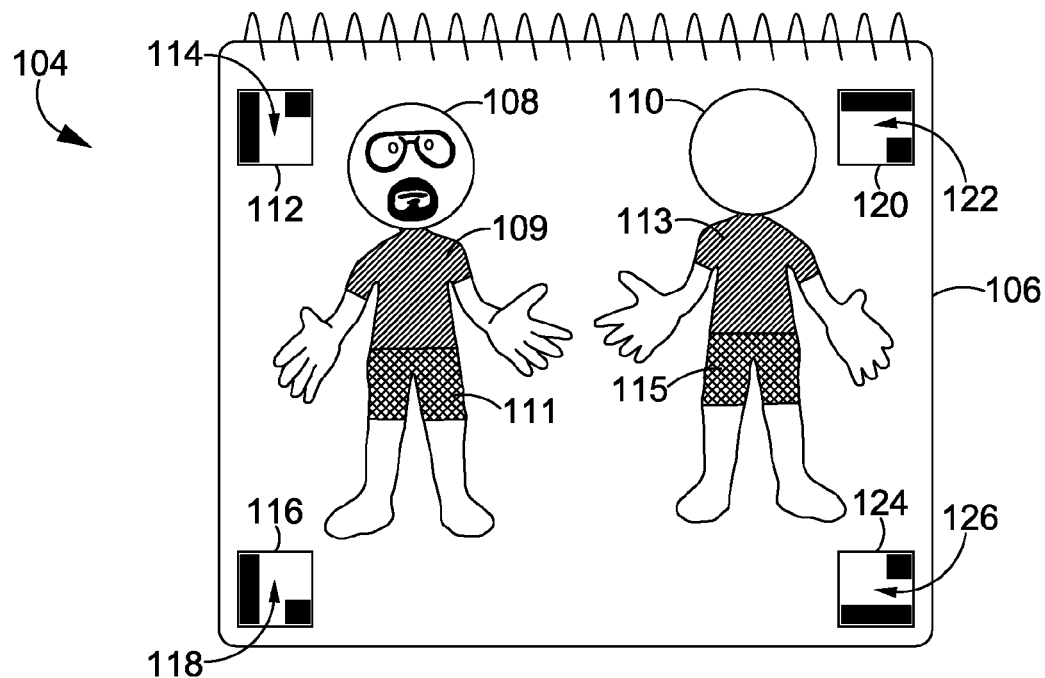
FIG. 5 is an exemplary template image for generating an animated segment, in accordance with an embodiment of the invention.

Turning next to FIG. 5, an exemplary template page 104 is provided, for generating an animated segment in accordance with an embodiment of the invention. The template page 104 includes a template sheet 106 with a first image 108, a first coloring portion 109, a second coloring portion 111, a second image 110, a third coloring portion 113, a fourth coloring portion 115, a first indicator 112 with indicator content 114, a second indicator 116 with indicator content 118, a third indicator 120 with indicator content 122, and a fourth indicator 124 with indicator content 126. In one embodiment, a user may select a particular character (e.g., first character 14) and then color the template sheet 106 corresponding to the selected character. In one embodiment, the user may color one or more parts of the corresponding template sheet 106, including one or more of the first, second, third, and fourth coloring portions 109, 111, 113, and 115. Upon adding a desired coloring to the first image 108 and the second image 110, a computing device executing an animation application and/or interface may be used to scan/view the template sheet 106 for capturing an image of the user's colored content. In one embodiment, the animation app may be configured to automatically identify the colored content of the specific character template based on identifying the indicator content 114, 118, 122, and 126 of the first, second, third, and fourth indicators 112, 116, 120, and 124.

Figure 6:
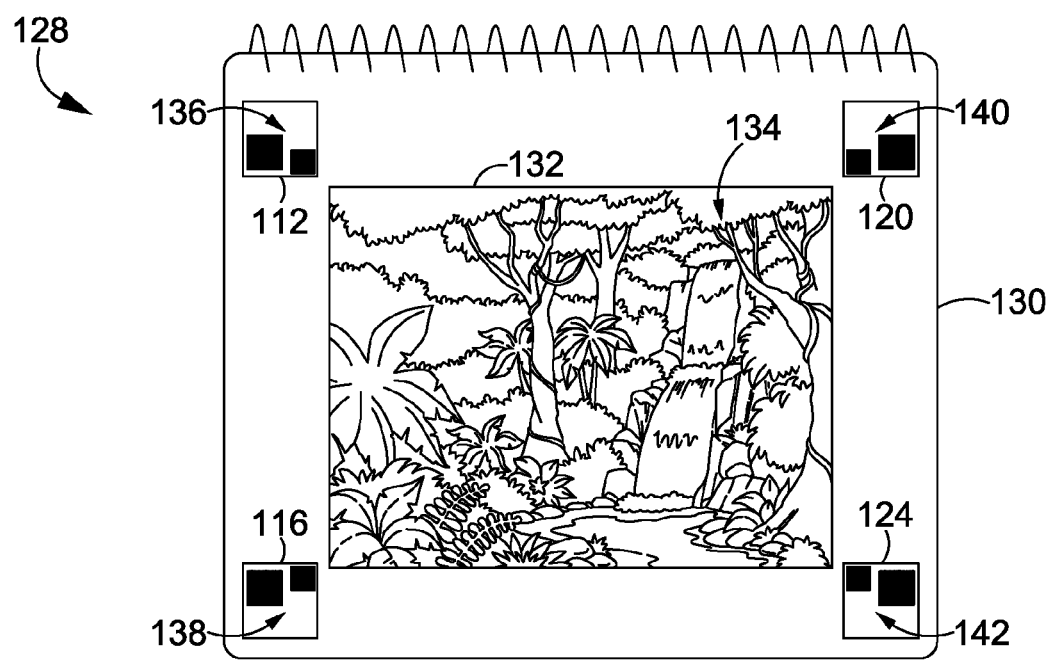
FIG. 6 is an exemplary template background for generating an animated segment, in accordance with an embodiment of the invention.

Similarly, as shown in FIG. 6, an exemplary template page 128 includes a template sheet 130 having colorable background 132 with coloring content 134 for generating an animated segment according to an embodiment of the invention. In one embodiment, the animation app may be configured to automatically identify the colored content of the specific background template based on identifying the indicator content 136, 138, 140, and 142 of the first, second, third, and fourth indicators 112, 116, 120, and 124.

Figure 7:
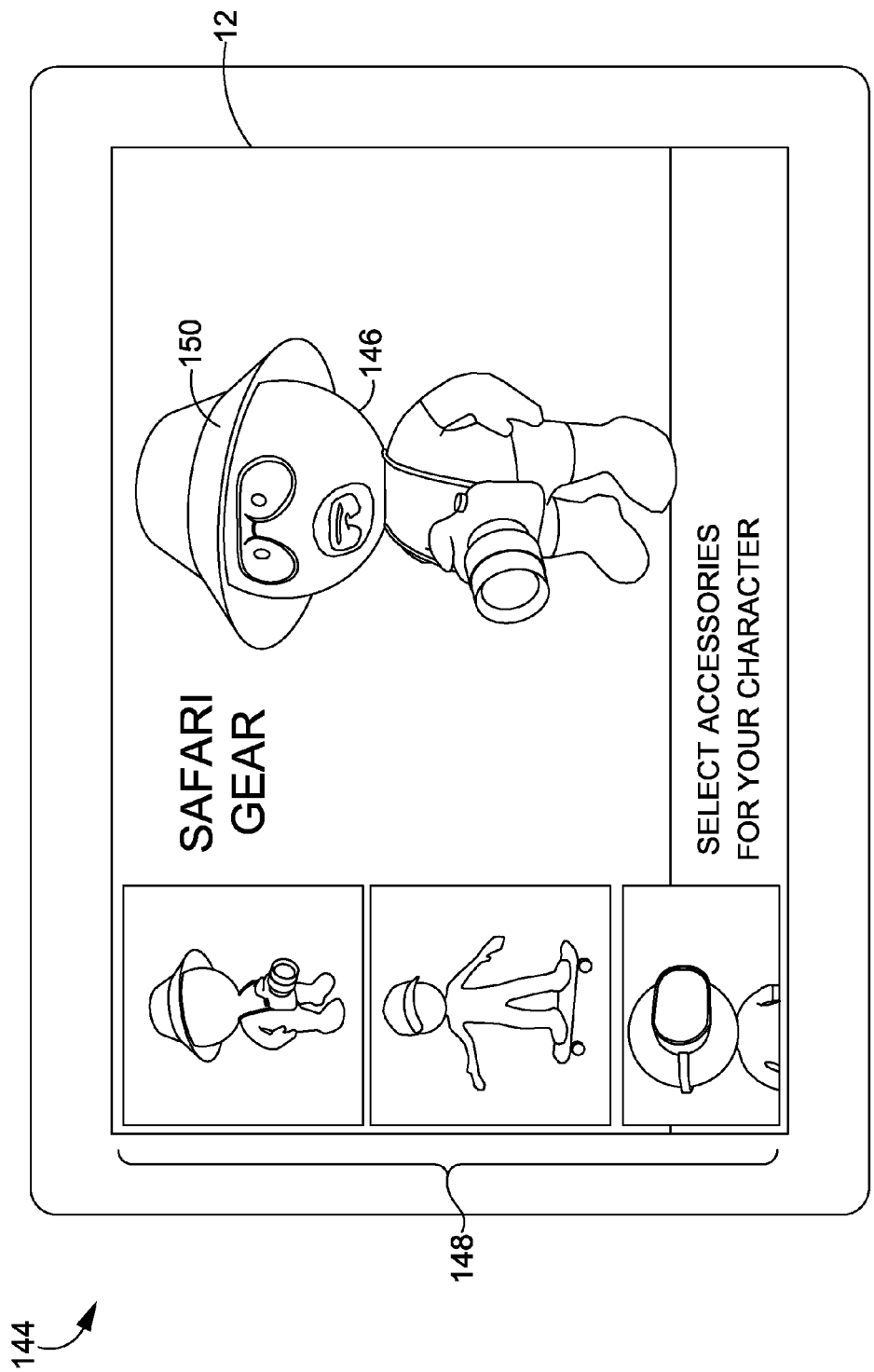
FIG. 7 is an exemplary accessory template for generating an animated segment, in accordance with an embodiment of the invention.
Figure 8:
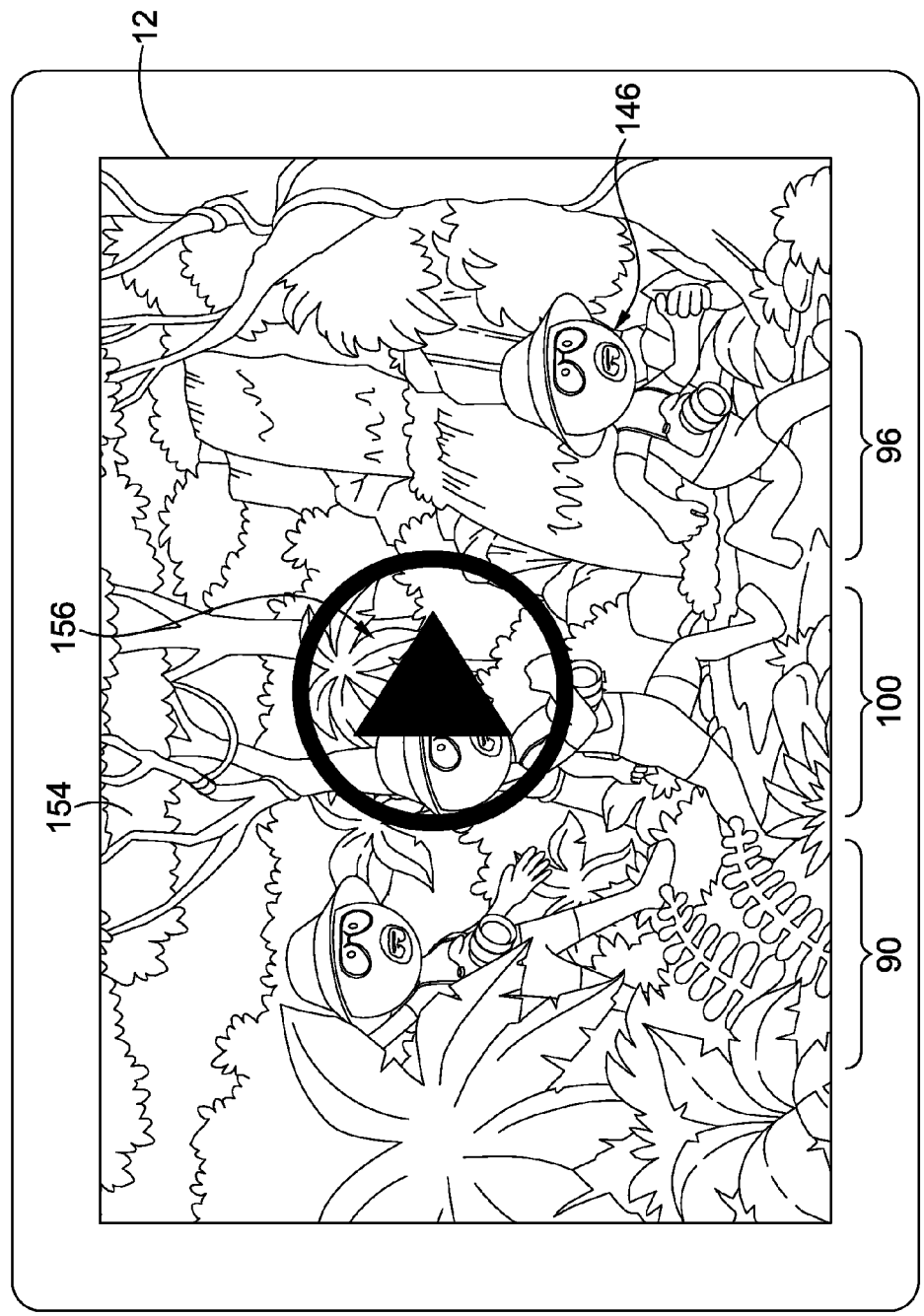
FIG. 8 is an exemplary animation segment generated according to an embodiment of the invention.

Turning next to FIG. 7, is an exemplary accessory template 144 is provided for generating an animated segment according to an embodiment of the invention. The display 12 of FIG. 7 includes a character 146 configured to receive one or more accessories 148, such as the selected accessory 150 that becomes incorporated with the character 146 for animation by the animation interface. In FIG. 8, an exemplary animation segment 152 is generated according to an embodiment of the invention. In this example, the display 12 includes an animation environment 154 (as colored according to template page 130) for displaying an animation of the animation character 146, including positions such as the first pose 90, the second pose 96, and the intermediate transition pose 100 generated by the animation interface. In one aspect, an animation playback indicator 156 may prompt the animation interface to present the completed animation sequence on the display 12, including the user-colored content of the character template page 106 applied to the various poses of the character 146, as well as the user-colored content of the background template page 130 applied to one or more scenes of the background in the animation.

According to further embodiments of the invention, as shown in the exemplary animation kit 158 of FIG. 9, the animation interface may be used with one or more components including a kit case 160, one or more coloring markers 162, one or more coloring crayons and/or pencils 164, and one or more features of the armature and stand as discussed above.

Figure 10A:
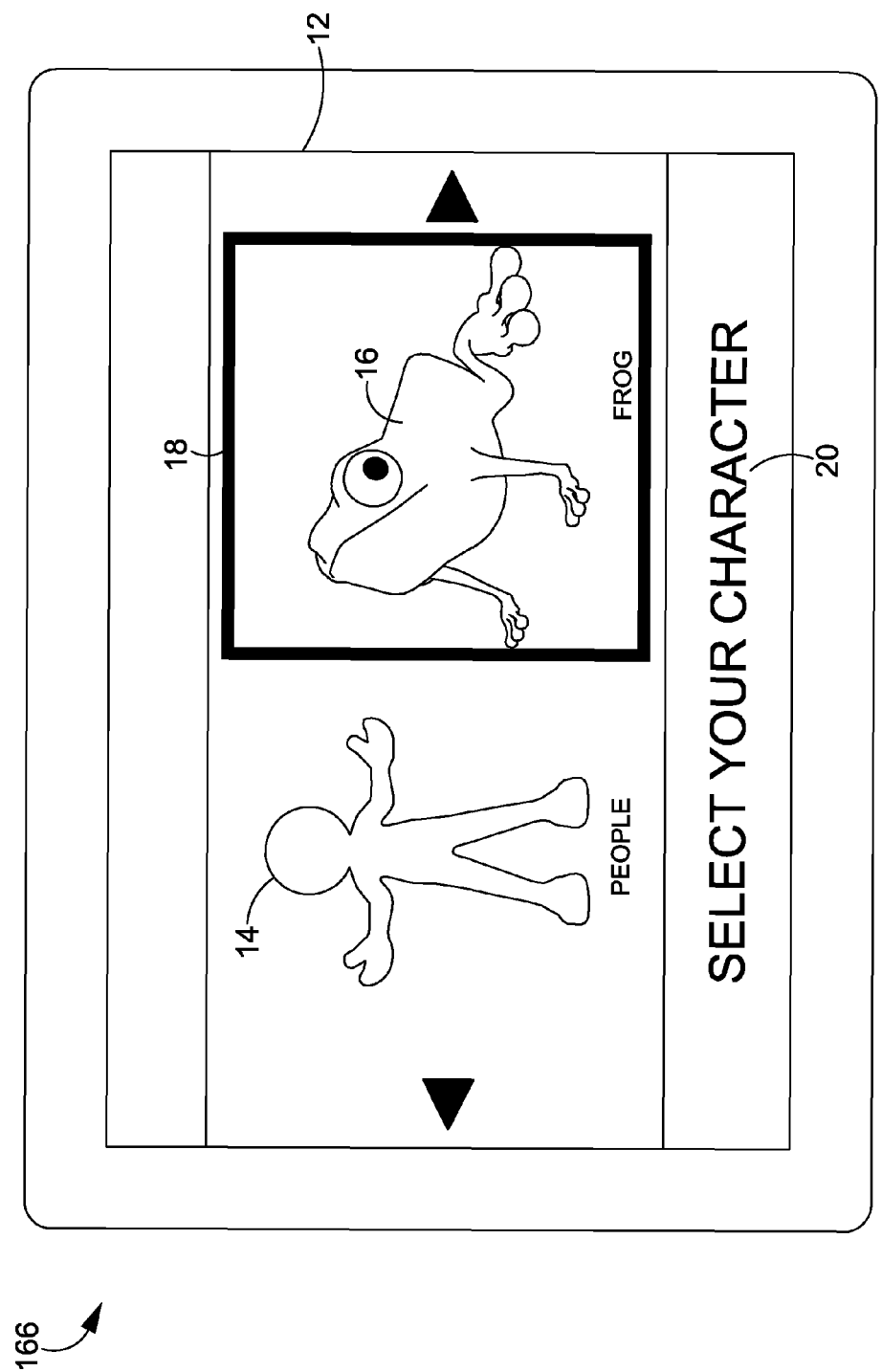
FIG. 10A is an exemplary interface for generating an animated segment, in accordance with an embodiment of the invention.
Figure 10B:
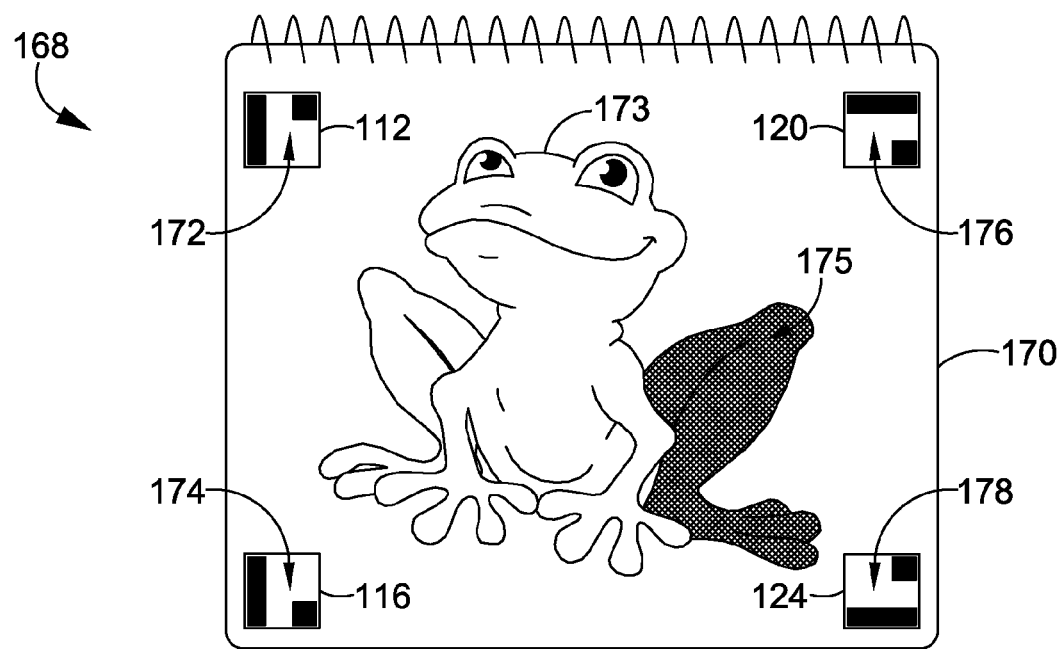
FIG. 10B is an exemplary template image for generating an animated segment, in accordance with an embodiment of the invention.

In further embodiments of the invention, the animated character may include a non-human figure, as shown in the exemplary interface 166 of FIG. 10A. In this example, the selection indicator 18 indicates that the poses provided by an armature may correspond to one or more poses of the selected second character 16. FIG. 10B includes a coloring template 168 having a template page 170, with a character 173 having a colored portion 175, a first indicator with indicator content 172, a second indicator 116 with indicator content 174, a third indicator 120 with indicator content 176, and a fourth indicator 124 with indicator content 178. In embodiments, the indicator content 172, 174, 176, and 178 of each of the first, second, third, and fourth indicators 112, 116, 120, and 122 correspond to the colorable content of the character 173, which corresponds to the second character 16 selected by the user in FIG. 10A.

Figure 10C:
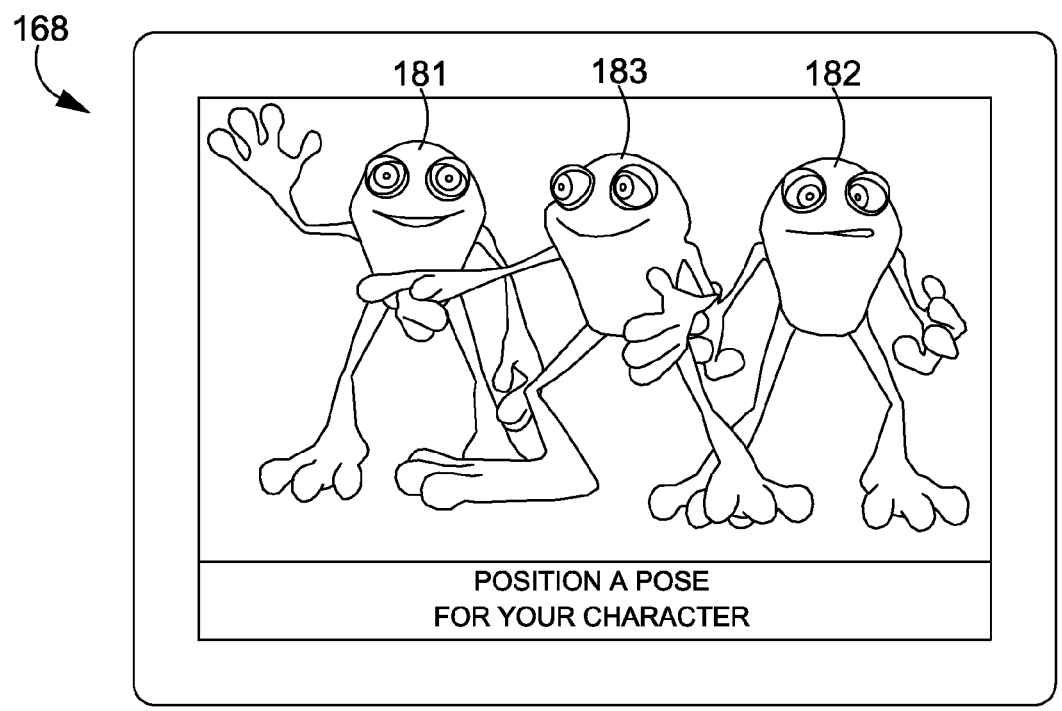
FIG. 10C is an exemplary interface for generating an animated segment, with multiple poses of an armature captured by the computing device, in accordance with an embodiment of the invention.

In response to poses of the armature captured by a camera of a computing device, such as the poses of the armature 86 in FIG. 2B, the resulting animated segment of FIG. 10C includes a first animation pose 181, a second animation pose 182, and an intermediate/transition pose 183 that is generated by the animation app to transition the resulting animation between the first and second animation poses 181 and 182.

Figure 11:
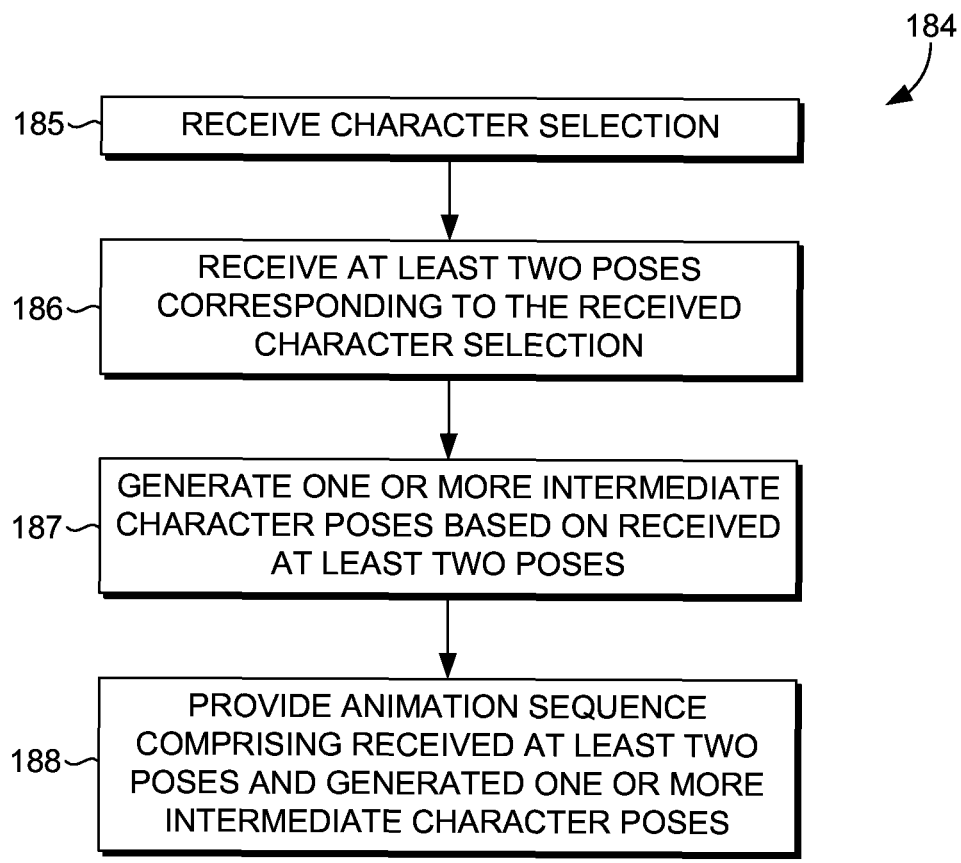
FIG. 11 is an exemplary flow diagram of a method for generating an animation sequence, in accordance with an embodiment of the invention.

Turning next to FIG. 11, an exemplary flow diagram 184 of a method for generating an animation sequence is provided according to an embodiment of the invention. At block 185, a character selection is received, such as the character selection via the animation interface of FIGS. 1 and 10A. At block 186, at least two poses corresponding to the received character selection are received. At block 187, one or more intermediate and/or transitional character poses are automatically generated based on the received at least two poses. For example, the animation app may automatically generate a transition pose that manipulates a character into one or more positions that couple the first and second poses of a character into a smooth series of animation movements. At block 188, the animation sequence is provided, including the received at least two poses and the generated one or more intermediate character poses.

Figure 12:
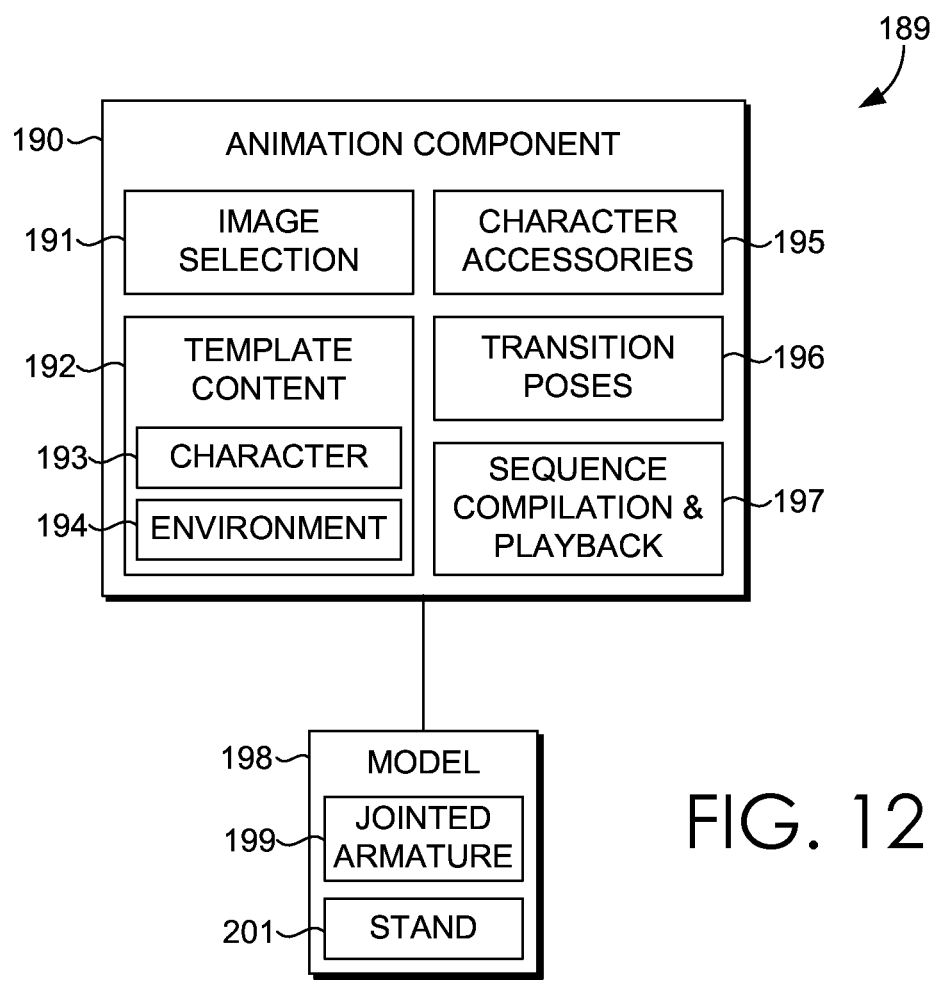
FIG. 12 is an exemplary system diagram of an animation component for use with an armature model, in accordance with an embodiment of the invention.

Referring next to FIG. 12, an exemplary system diagram 189 for generating an animation sequence includes an animation component 190 for use with an armature model 198, in accordance with an embodiment of the invention. In one example, the animation component 190 includes an image selection component 191, a template content component 192 having a character component 193 and an environment component 194, a character accessory component 198, a transition pose component 196, and a sequence compilation and playback component 197. In further aspects, the exemplary system diagram 189 includes an armature model 198 including a jointed armature 199 and a stand 201 that may be used to generate a series of poses for directing the animation by the animation component 190. As such, in one embodiment of the invention, a user may pose the jointed armature 199 secured by the stand 201, and capture multiple user-generated poses by the computing device executing one or more features of the animation component 190. In further aspects, the user may then color in one or more template pages of template content 192, including front and back views of a character 193, and one or more environments 194 for including in the animation. Once automatically captured by the computing device, character accessories 195 may be added to the user's colored character. The animation component may then generate transition poses 196 to provide a sequence compilation for playback 197.

Further embodiments of the invention are directed to a two-dimensional template image for capture by an augmented reality computing application operating on a mobile computing device. In embodiments, as shown at least in the examples of FIGS. 13-29, the computing application is configured to receive a captured image of a colored, two-dimensional template image including a two-dimensional character image and generate a three-dimensional animated character based on the two-dimensional character image. In further embodiments, an application-generated three-dimensional animated character may be superimposed on a user environment viewed by the computing device, such that a two-dimensional character image becomes animated in the context of the viewed user environment. In further embodiments, at least a portion of the captured image of the two-dimensional drawing template may be animated for interaction and/or viewing from multiple perspectives within a three-dimensional animation environment including one or more portions of the user environment viewed by the computing device.

Figure 13:
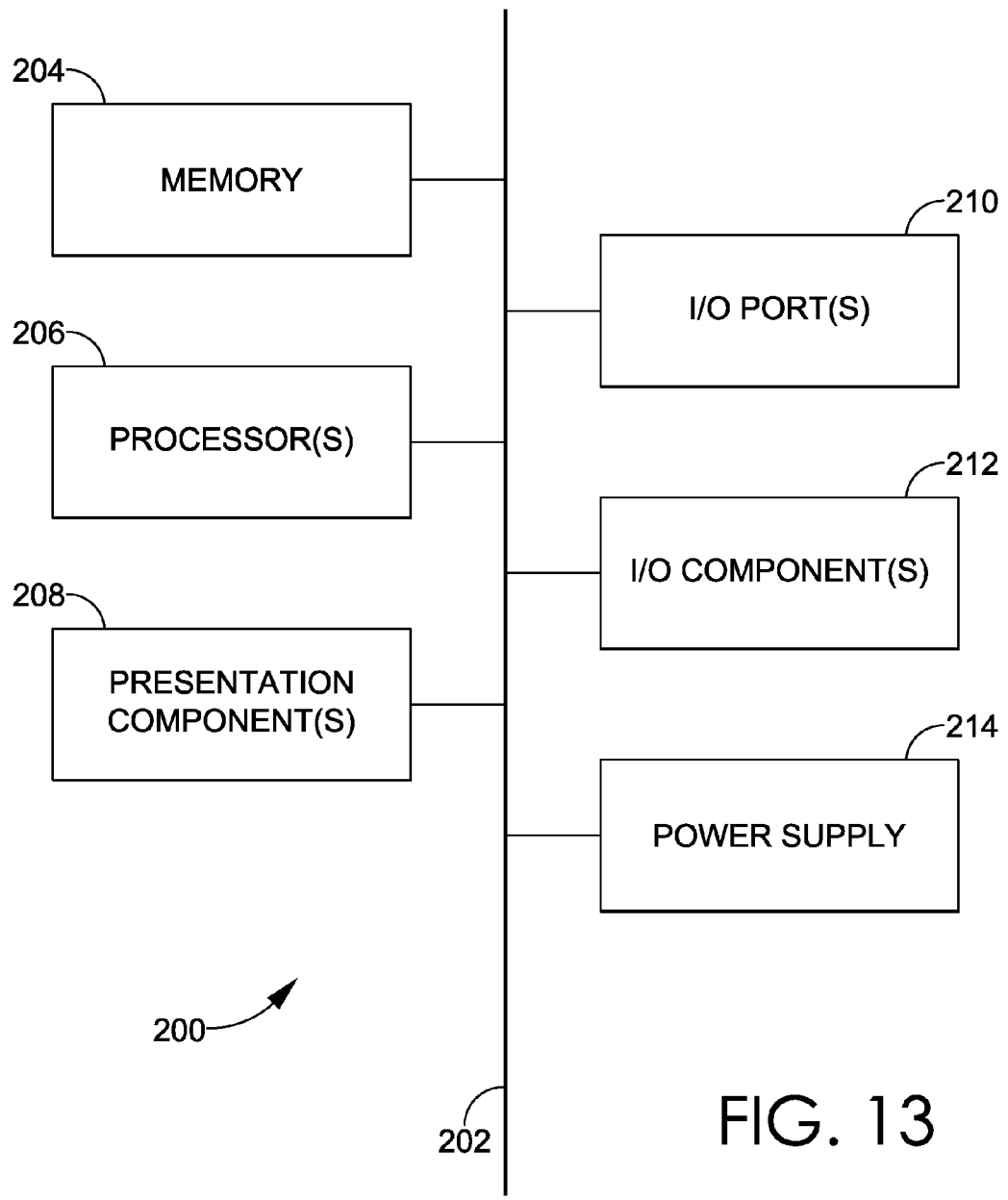
FIG. 13 is a diagram of an exemplary mobile computing device, in accordance with an embodiment of the invention.

Turning to FIG. 13, a schematic block diagram of an exemplary mobile computing device 200 is shown. In embodiments, the computing device 200 includes a bus 202 that directly or indirectly couples the following devices: memory 204, one or more processors 206, one or more presentation components 208, input/output (I/O) ports 210, input/output components 212, and an illustrative power supply 214. The bus represents what may be one or more busses (such as an address bus, data bus, or combination thereof). Further, the computing device 200 typically includes a variety of computer-readable media. Computer-readable media can be any available media that can be accessed by computing device 200 and includes both volatile and nonvolatile media, removable and nonremovable media.

Figure 14:
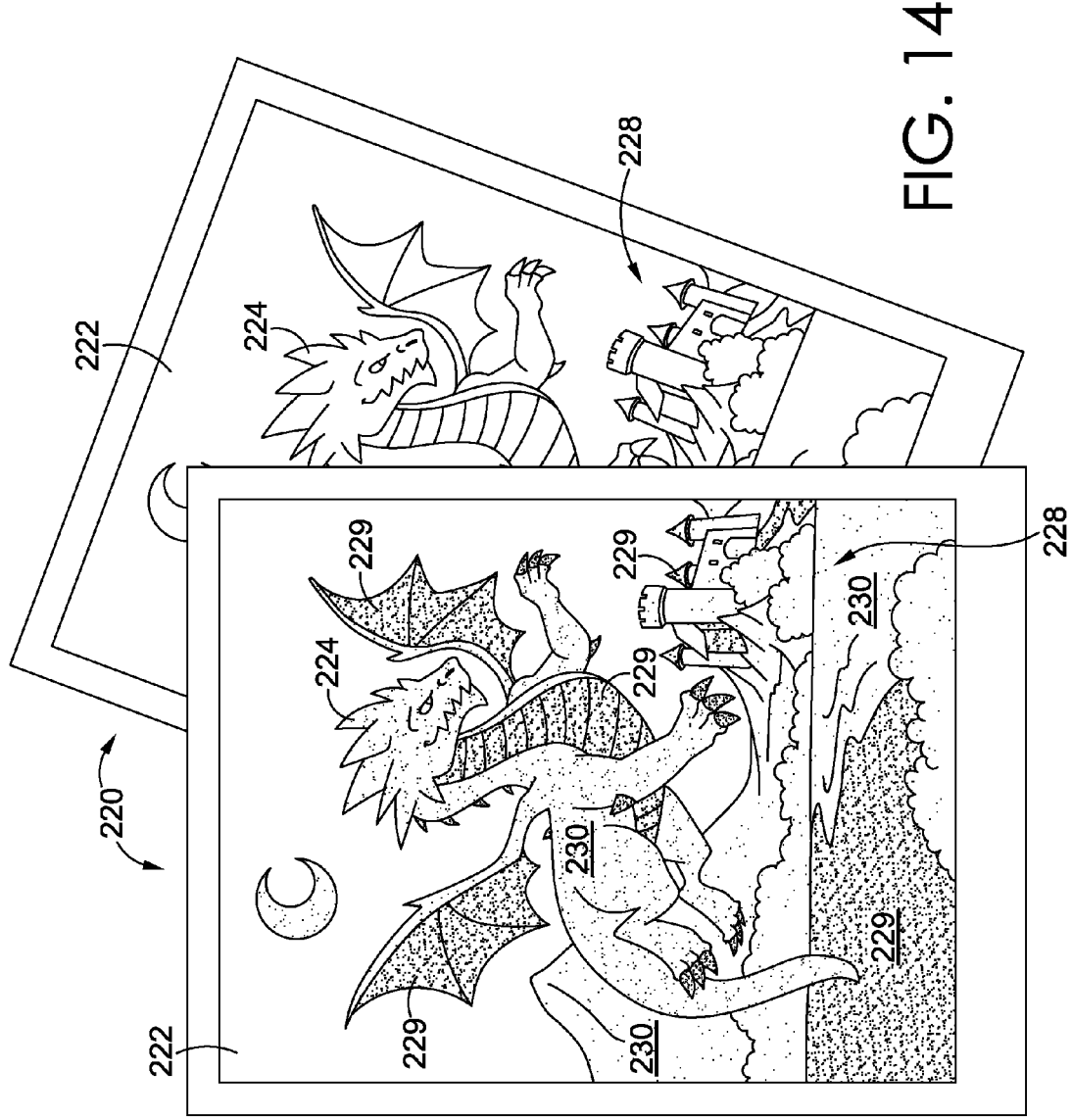
FIG. 14 depicts exemplary coloring pages, in accordance with an embodiment of the invention.

Two exemplary coloring pages 220 are shown in FIG. 14. The coloring pages 220 include a two-dimensional template image 222 comprising a two-dimensional character image 224. The two-dimensional template image 222 may also include a background image 228. The coloring pages 220 may come from various sources such as a coloring book, an individual page, or printed from a web page.

The two-dimensional template image 222 includes line drawings that are configured to receive colored markings. For example, the coloring page 220 on the right has not been colored. The coloring page 220 on the left has been colored in with colored markings 229, 230. A subset of the colored markings 230 may be of a special color that corresponds to an animated effect, as described below in FIG. 24, while other colored markings 229 are not. The colored markings may be made by any colored marking device including, but not limited to, crayons, markers, colored pencils, and colored pens. The colored markings may be solid or patterned. For example, a portion of the two-dimensional template image may be colored with polka dots while another portion is colored with stripes. The two-dimensional character image 224 shows a character at a perspective view with respect to the two-dimensional template 222. This angle allows portions of at least the front and side of the character to be visible for coloring. The character may be an animal, a person, a machine, a mythical creature, and the like.

Figure 15:
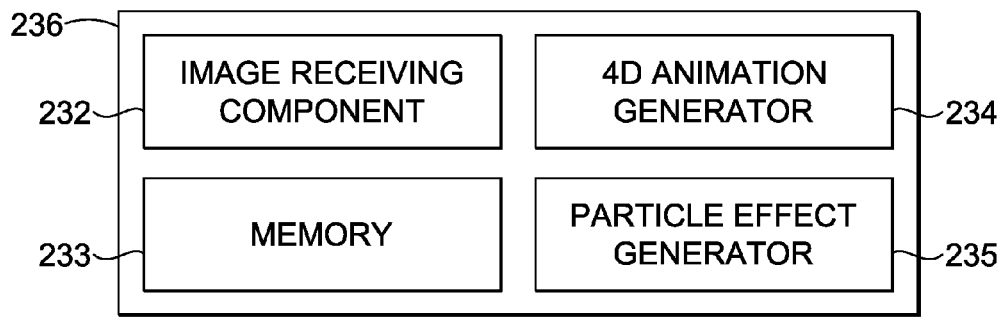
FIG. 15 is a diagram of an exemplary computing application, in accordance with an embodiment of the invention.

FIG. 15 shows a diagram of an exemplary computing application 236. The computing application 236 comprises at least an image receiving component 232, a memory 233, a four-dimensional (4-D) animation generator 234, and a particle effect generator 235.

The image receiving component 232 utilizes a camera function of the mobile device 200 on which the computing application is running. The image receiving component 232 functions to scan a two-dimensional template image 222 on a coloring page 220 or take still photos.

The memory 233 stores one or more three-dimensional templates corresponding to two-dimensional template images 222. The memory 233 may also store still photos and three-dimensional animated characters 268 created by the computing application 236.

The 4-D animation generator 234 generates three-dimensional animated characters 268 based on the two-dimensional character image 224 from a scanned two-dimensional template image 222. If the two-dimensional template image 222 is colored, the 4-D animation generator 234 will color the three-dimensional animated character 268 to correspond to the colored markings on the two-dimensional character image 224. This process is explained further below in FIG. 18. The 4-D animation generator may be an augmented reality tool such as "4-D Studio" developed by DAQRI® (daqri.com).

The particle effect generator 235 displays animated effects over colored markings 229 of a two-dimensional template image 222 such that a particular color corresponds with a particular animated particle effect 278. This process is explained further below in FIG. 24.

Figure 16:
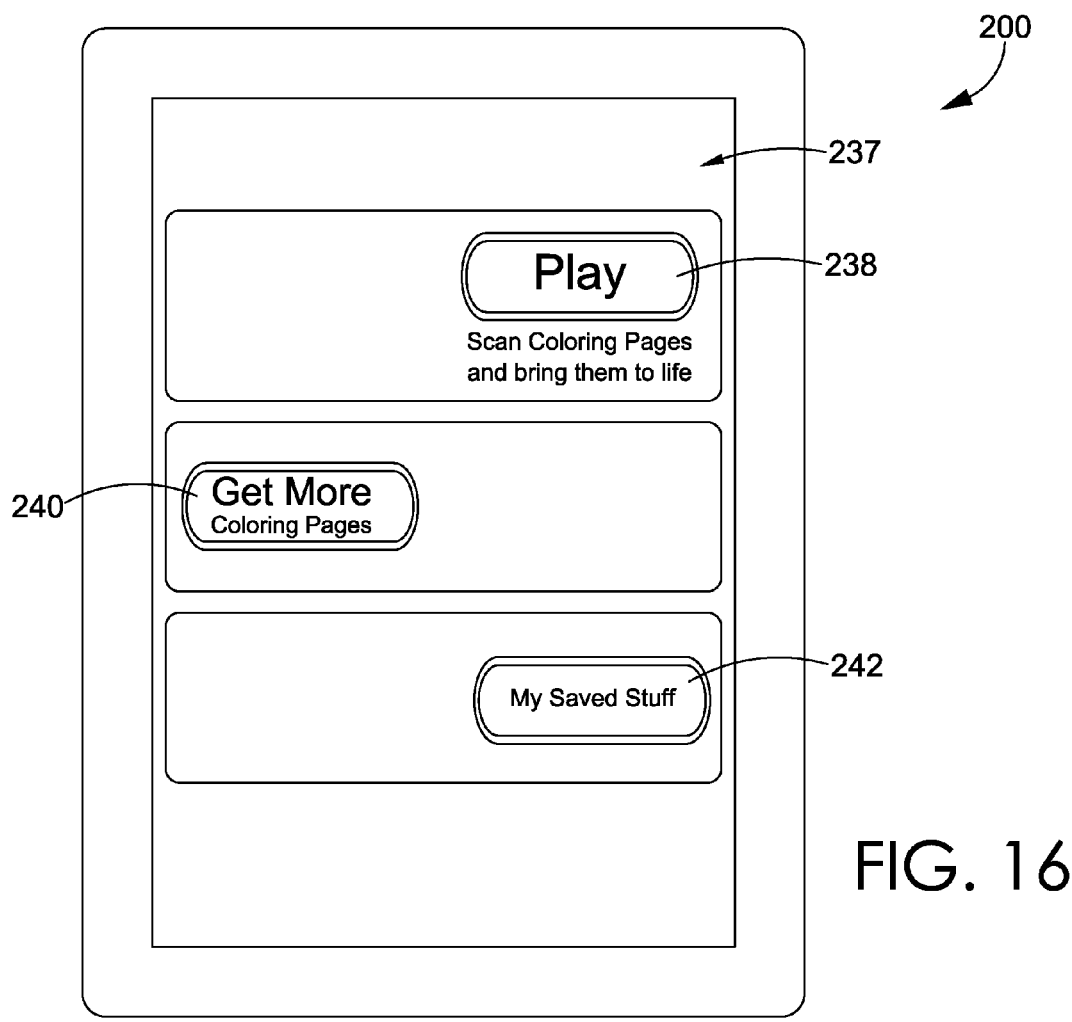
FIG. 16 is an exemplary view of a computing application executed on a mobile computing device, in accordance with an embodiment of the invention.

Turning to FIG. 16, an exemplary computing application 236 is shown operating on a mobile computing device 200. In this view, a first menu screen 237 is presented to a user with options for selection. The "Play" button 238, when selected, causes the computing application 236 to present the screen shown in FIG. 17 for a user to create animated effects based on a two-dimensional template image 222 colored by the user. The "Get More" button 240, when selected, presents the user with options of additional coloring pages to print from the mobile computing device 200. The coloring pages may be free or incur an additional charge for access. The "My Saved Stuff" button 242 accesses the memory 233 of the computing application 236, where a user may save images and characters from previous uses of the computing application 236. For example, a user may save a three-dimensional animated character 268 generated from a custom colored two-dimensional template image 222 and name the character "Smoky." The user may also take still photos of a three-dimensional animated character 268 in the user's environment, as described further below.

Figure 17:
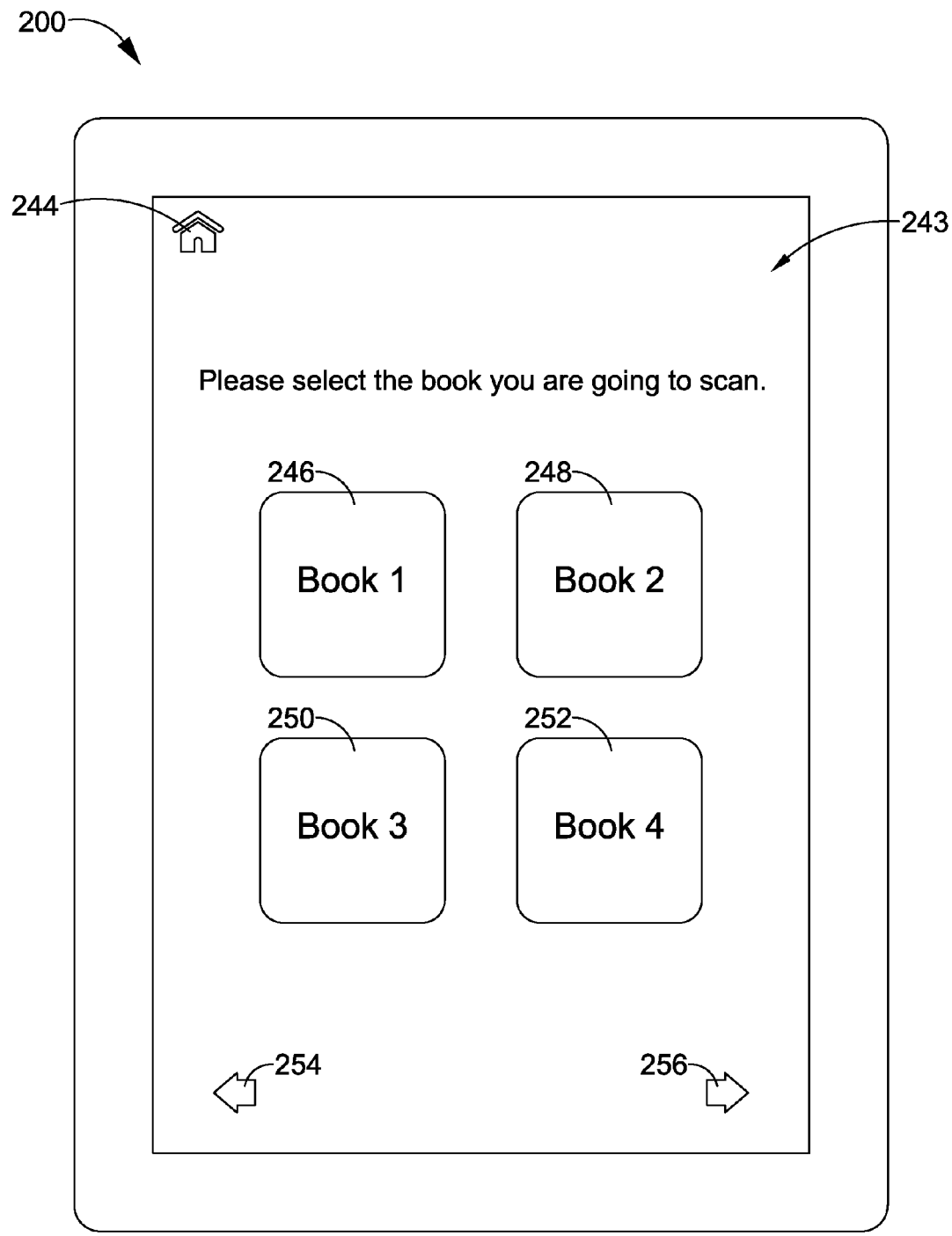
FIG. 17 is an exemplary view of a computing application executed on a mobile computing device, in accordance with an embodiment of the invention.

As mentioned above, selection of the "Play" button 238 then presents a second menu screen 243, as shown in FIG. 17. The second menu screen 243 lists various options of sources for coloring pages. For example, the sources could be coloring books and a user may select a coloring book corresponding the coloring book in which the user colored a coloring page. There are four options displayed in FIG. 17: "Book 1" 246, "Book 2" 248, "Book 3" 250, and "Book 4" 252. For example, if a user colored in the coloring page 220 from FIG. 14 which is found in Book 1, the user would select the "Book 1" button 246. The sources may be identified by titles and/or cover images. For example, the dragon two-dimensional character image 224 of FIG. 14 may correspond to the source of a coloring book identified by the title "Mythical Creatures" and the image of a dragon. Alternatively, a coloring page featuring a two-dimensional character image 224 of a fairy may correspond to the source of a coloring book identified by the title "Enchanted Forest" and the image of a fairy.

The user may navigate to additional source options by selecting the left navigation arrow 254 or right navigation arrow 256 to view other options. For example, the source of the coloring page 220 may be a template printed from the internet, printed from the computing application, or from additional coloring books. There is also a "Home" button 244 to navigate the computing application to the main screen, such as the screen shown in FIG. 16.

Figure 18:
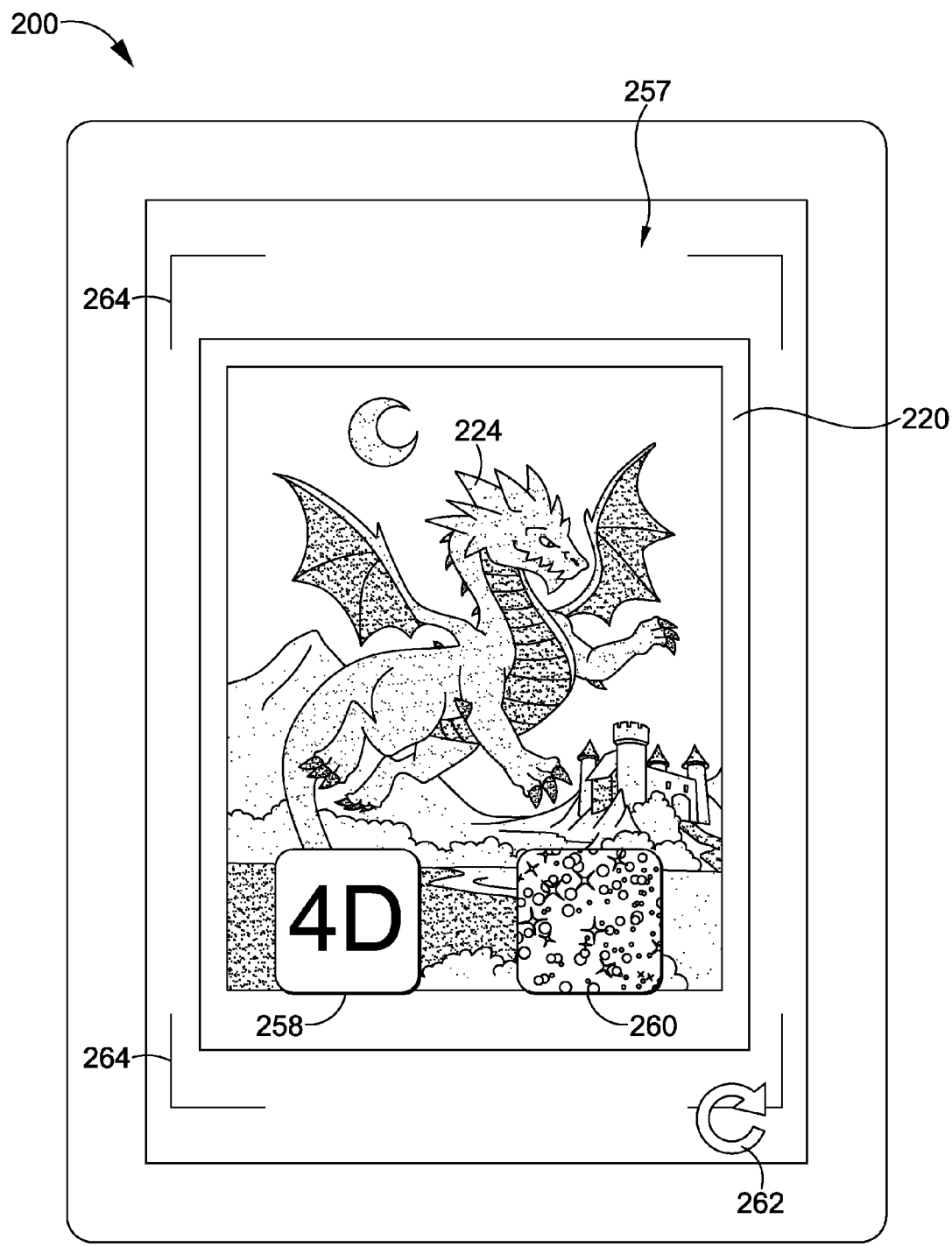
FIG. 18 is a view of an exemplary coloring page viewed with an exemplary computing application, in accordance with an embodiment of the invention.

FIG. 18 depicts the computing application 236 displaying a scanning screen 257 after a user has selected a coloring book, as described above with respect to FIG. 17. The computing application 236 activated the image receiving component 232 to scan a coloring page 220. In the example shown in FIG. 18, a user has colored the coloring page 220 having a dragon two-dimensional character 224. The user holds the mobile computing device 200 such that the coloring page 220 is visible within the viewing area of the mobile computing device 200. There may be alignment guides 264 on the screen to assist the user in positioning the coloring page 220 for proper scanning by the computing application 236. The user selects the "4-D" button 258 to activate a three-dimensional animation effect. Alternatively, the user may select the "special effects" button 260 to create a special effect on the coloring page 220. There may also be a return button 262, which returns the computing application 236 to the previous screen when selected.

Figure 19:
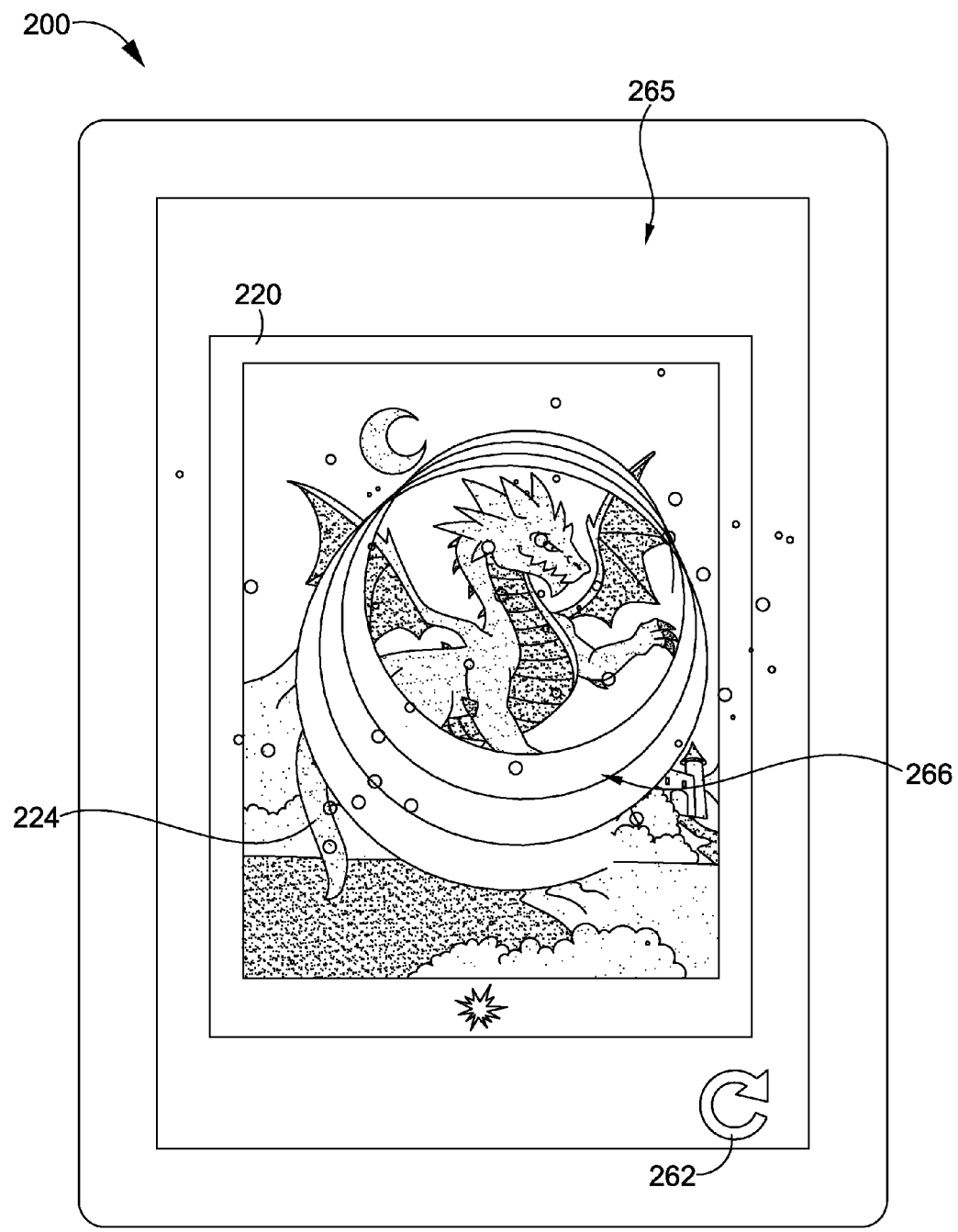
FIG. 19 is a view of an exemplary computing application creating a transition effect on a coloring page, in accordance with an embodiment of the invention.

FIG. 19 presents another view 265 of the computing application 236 operating on a mobile computing device 200. At this point, the computing application 236 has scanned the coloring page 220 and is creating a transition effect 266 over the image.

Figure 20:
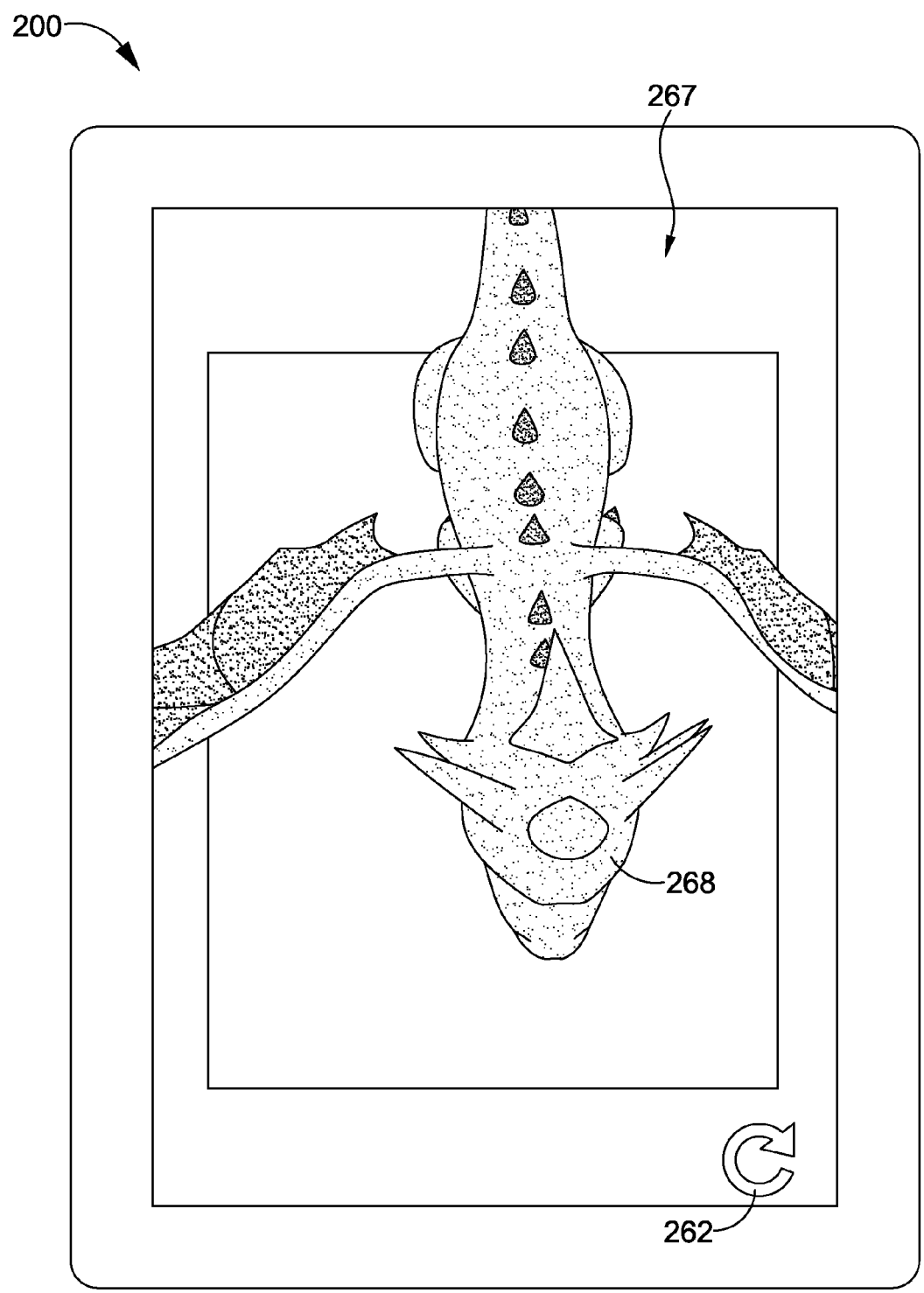
FIG. 20 is a view of an exemplary 3-D animated character generated with an exemplary computing application on a mobile device based on the coloring pages of FIG. 14, in accordance with an embodiment of the invention.

FIG. 20 shows a view 267 of a mobile computing device 200 just after the computing application 236 has presented an exemplary three-dimensional animated character 268 for the user to view. Here, the two-dimensional character image 224 of a dragon has been transformed into a three-dimensional animated character 268 of a dragon.

The three-dimensional animated character 268 is colored to correspond to the colored two-dimensional character image 224 by coloring nonvisible portions of the two-dimensional character image 224 to match visible portions of the two-dimensional character image 224. For example, with reference to the dragon two-dimensional template image 222 of FIG. 14, the dragon two-dimensional character image 224 is shown such that the dragon is shown in a perspective view. Visible portions include the outside of the right arm and right leg, the inside of the left arm and left leg, the right side of the face, and the front of the left wing and right wing. Non-visible portions include the inside of the right arm and right leg, the outside of the left arm and left leg, the left side of the face, and the back of the left wing and right wing. The 4-D animation generator 234 of the computing application 236 functions to fill non-visible portions of the character with the same color used to fill the corresponding visible portions of the character. If the outside of the right arm is red on the two-dimensional character image 224, the 4-D animation generator 234 will color the inside of the right arm red in the three-dimensional animated character. Similarly, if the inside of the left leg is colored blue on the two-dimensional character image 224, the outside of the left leg will be colored blue in the three-dimensional animated character.

Other methods of coloring non-visible portions are possible such as repeating patterns, symmetry, and extending color to adjoining parts. The 4-D animation generator 234 also takes into account colored portions having patterns. For example, if the front of the dragon's left wing is colored yellow with green spots on the two-dimensional template image, the back of the dragon's left wing will be green with yellow spots in the three-dimensional animation.

Figure 21:
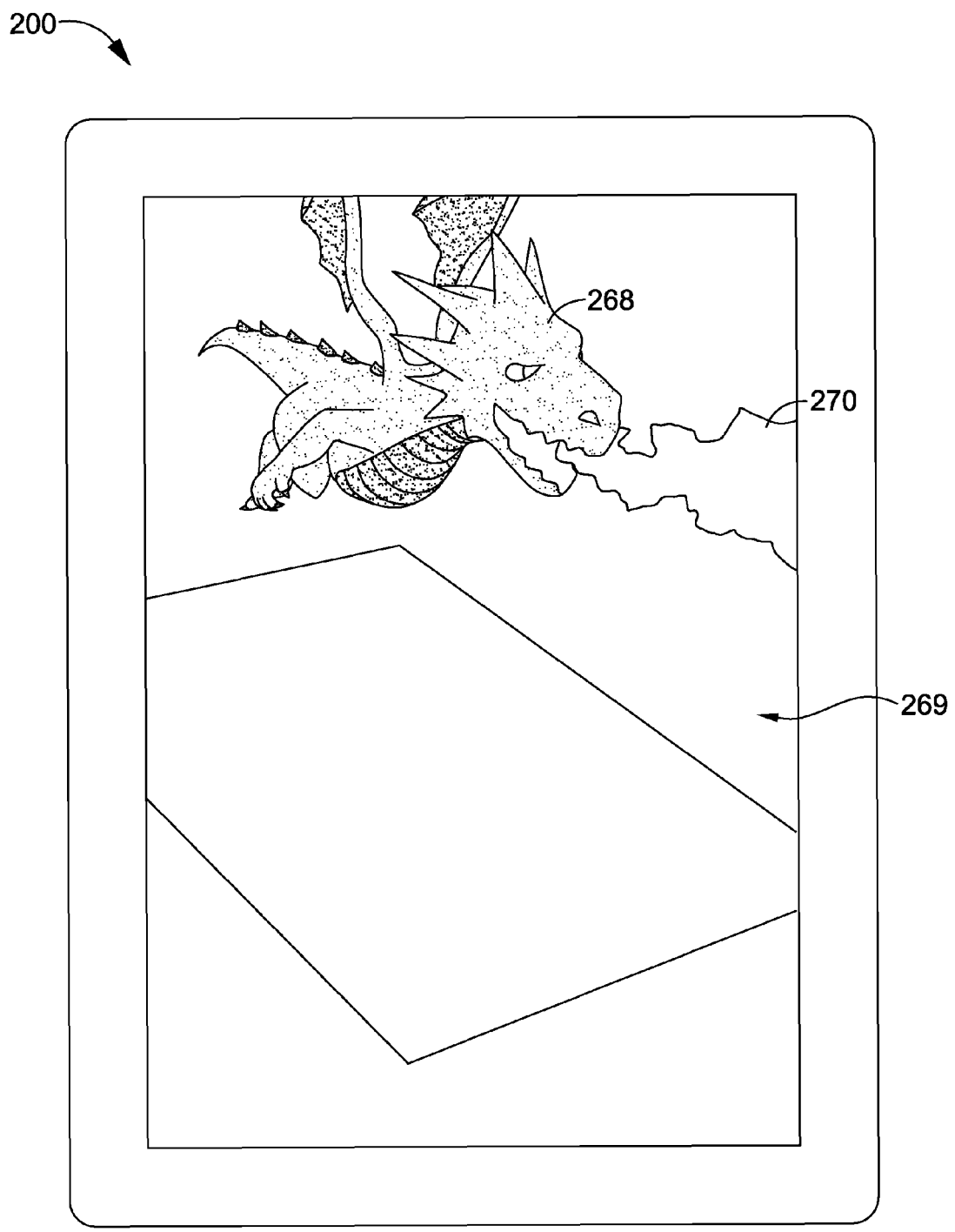
FIG. 21 is an alternate view of the 3-D animated character of FIG. 20, in accordance with an embodiment of the invention.

FIG. 21 shows another view 269 of the computing application 236 wherein the three-dimensional animated character 268 of a dragon is viewed from another angle by moving the mobile computing device 200. In this example the three-dimensional animated character 268 is flying. The computing application 236 may also provide additional action effects 270 that are activated upon user interaction with the three-dimensional animated 268. For example, upon tapping the dragon with a user's finger, the dragon breathes fire as its action effect 270.

Figure 22:
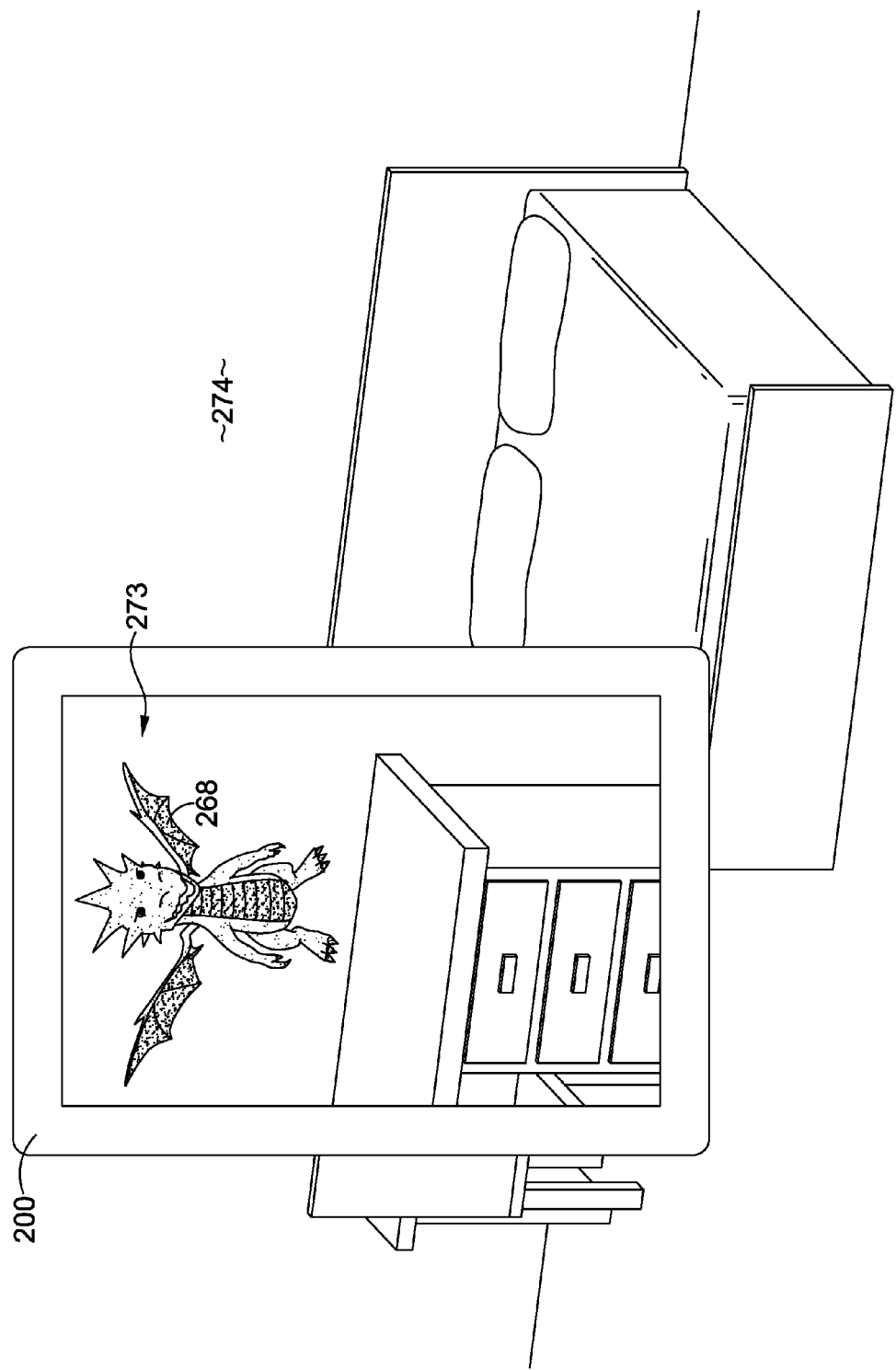
FIG. 22 is a view of the 3-D animated character of FIGS. 20-21 superimposed over a user's environment, in accordance with an embodiment of the invention.

The user may move the mobile computing device 200 such that the three-dimensional character 268 appears to be moving about the user's environment 274, as shown in FIG. 22. As shown in this view 273, the dragon three-dimensional animated character 268 appears to be flying around the user's environment 274 of a bedroom. The user may take still snapshots of the three-dimensional character 268 in the user's environment 274 and save the images in the memory 233 of the computing application 236.

Figure 23:
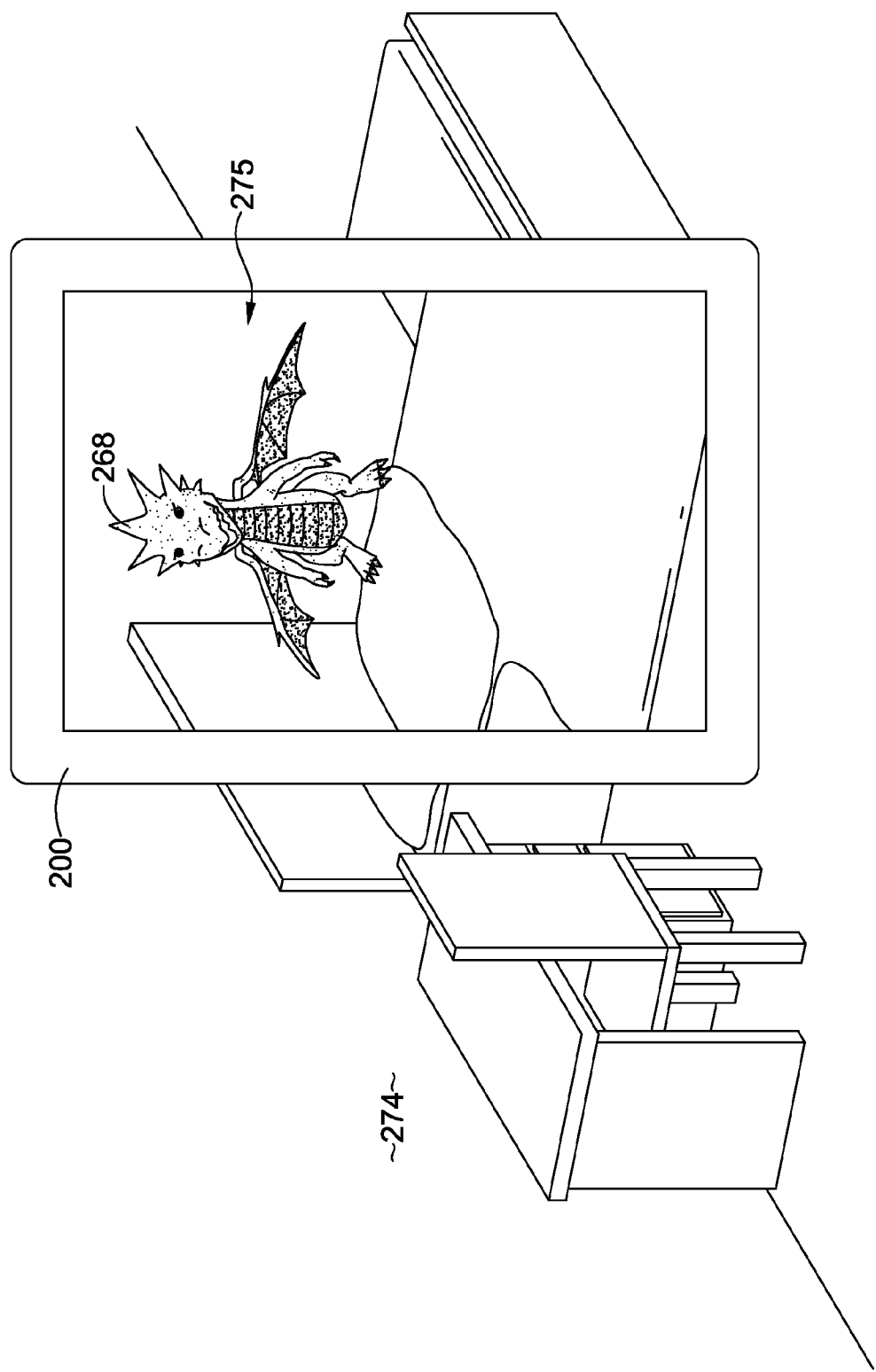
FIG. 23 is an alternate view of the 3-D animated character of FIGS. 20-22 superimposed over a user's environment, in accordance with an embodiment of the invention.

FIG. 23 depicts another view 275 of the three-dimensional animated character 268 displayed on a mobile computing device 200 to appear as though the dragon is flying in the user's environment 274. The three-dimensional animated character 268 may be saved in the memory 233 of the computing application 236 and recalled to present the character in a different user environment at a different time.

Figure 24:
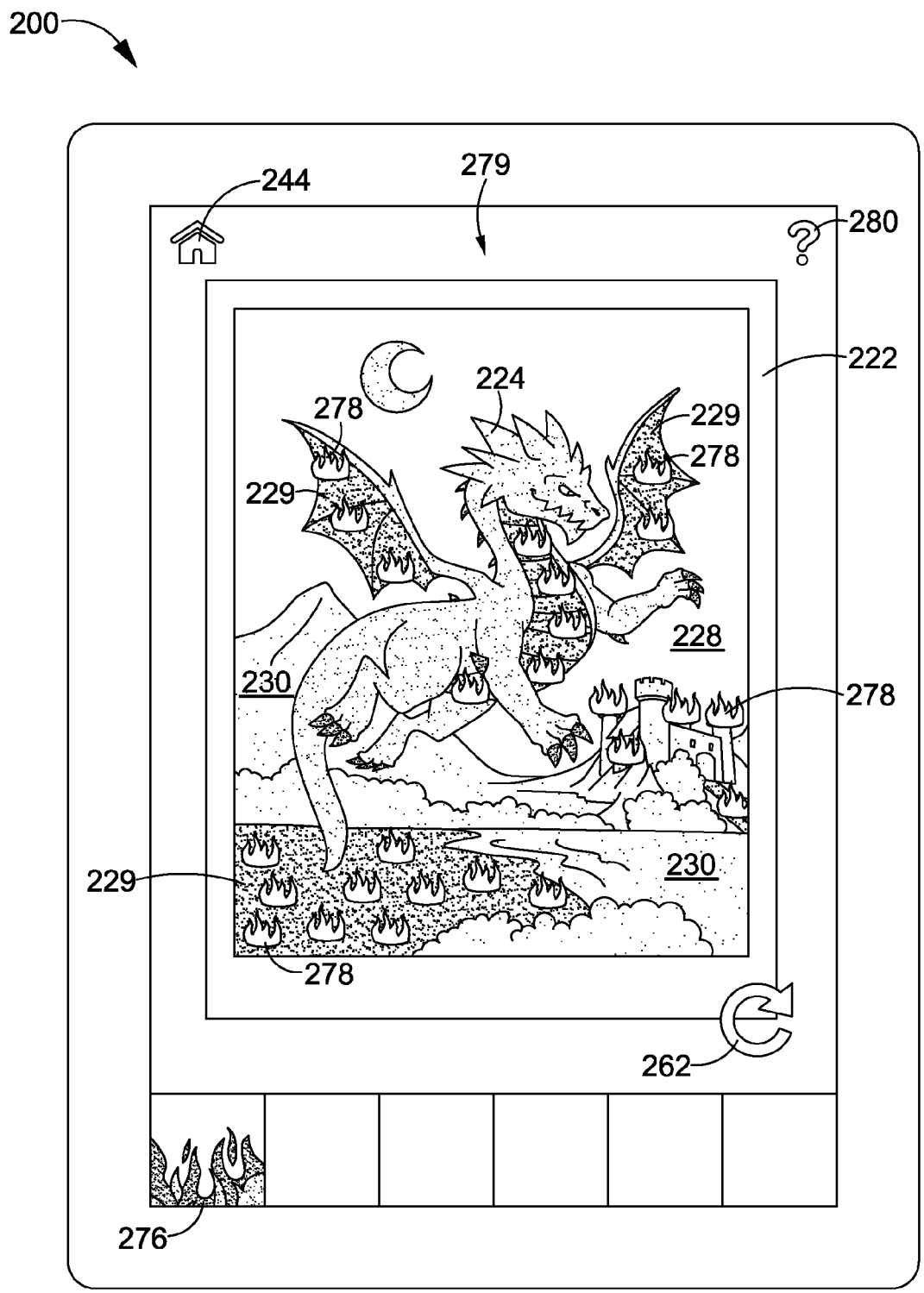
FIG. 24 is a view of a computing application generating particle effects over the coloring page of FIG. 18 in accordance with an embodiment of the invention.

Turning to FIG. 24, another view 279 of the computing application 236 operating on a mobile computing device 200 is shown, which is presented upon selection of the special effects button 260 shown in FIG. 18. This view 279 of the computing application 236 includes a home button 244, a help button 280, a return button 262, and one or more particle effect selectors 276.

In this example, a two-dimensional template image 222 having a dragon two-dimensional character image 224 has been colored in by a user with colored markings 229, 230. Upon activation of the particle effect selector 276, the computing application 236 generates a particle effect 278. A particle effect is a number of discrete effects located at particular individual points. The particle effects have a looped animated visual motion sequence effect having a brief duration. For example, the animation may loop every second or every five seconds. The particle effect 278 is configured to appear over colored markings 229 of a special color. The particle effect 278 animations may be spaced over regions of the special color such that portions of the underlying colored two-dimensional template image 222 are visible. In this example, a flame particle effect 278 appears over portions of the two-dimensional template image 222 which have been colored orange. The particle effect 278 does not appear over the other colored markings 230. The particle effect may be one or more of a defined visual effect, a defined sound effect, a visual motion sequence effect, and an auditor sequence effect. More specific examples of particle effects may include moving spider-webs, dancing bananas, shining ice crystals, sparkling glitter, and the like.

FIGS. 25-28 depict another example of using the computing application 236 operating on a mobile computing device 200 to generate a three-dimensional animated character 268 based on a colored two-dimensional character image 224 in a two-dimensional template image 222 of a coloring page 220.

Figure 25:
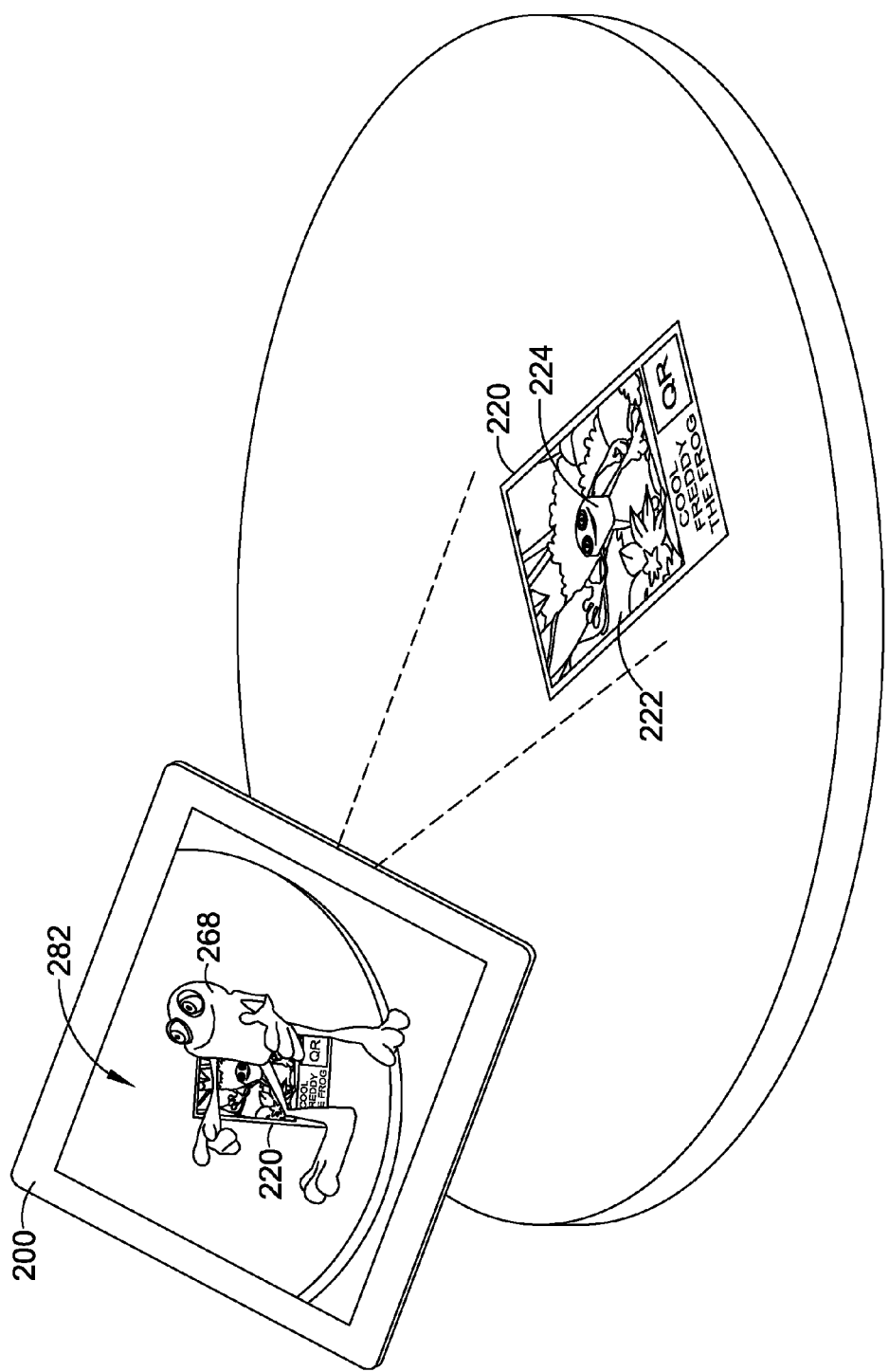
FIG. 25 is an exemplary view of a computing device displaying a 3-D animated image in context of a user environment, in accordance with an embodiment of the invention.
Figure 26:
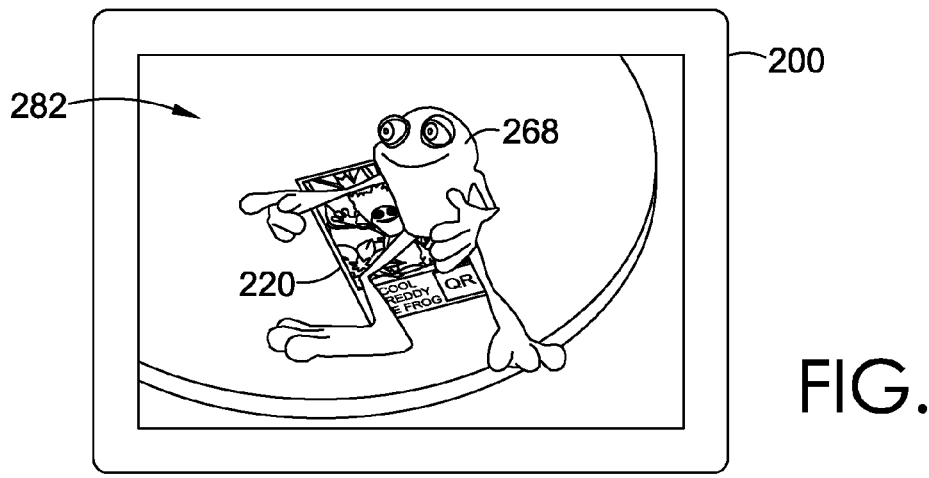
FIG. 26 is an exemplary interface of a 3-D animated image viewed in context of a user environment viewed by the computing device, in accordance with an embodiment of the invention.
Figure 27:
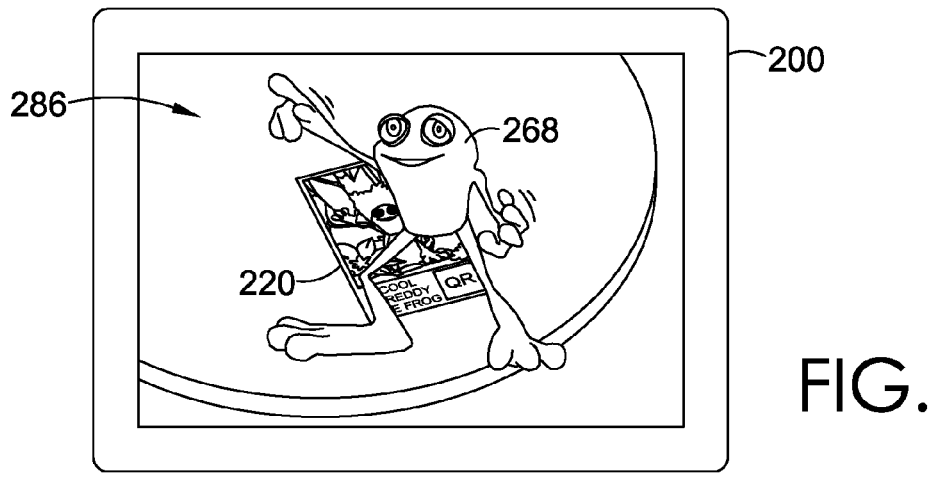
FIG. 27 is an exemplary interface of a 3-D, animated image viewed in context of a user environment viewed by the computing device, in accordance with an embodiment of the invention.
Figure 28:
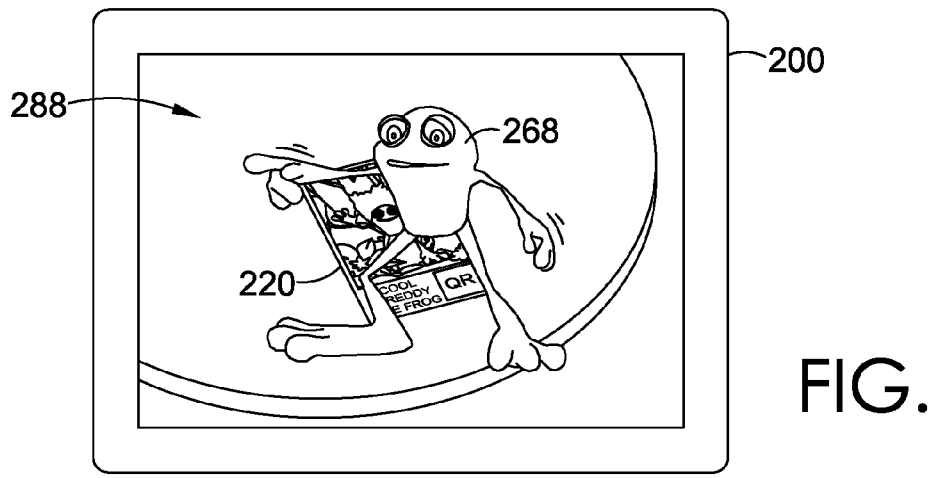
FIG. 28 is an exemplary interface of a 3-D, animated image viewed in context of a user environment viewed by the computing device, in accordance with an embodiment of the invention.

FIG. 25 depicts a first view 282 of the computing application generating a three-dimensional animated character 268 based on the two-dimensional character image 224 of "Cool Freddy the Frog." The computing application scans the two-dimensional template image 222 and converts the two-dimensional image into a three-dimensional animation based upon a corresponding three-dimensional animation template using the 4-D animation generator 234. FIGS. 26-28 show a sequence of movements of the three-dimensional animated character 268 on the mobile computing device 200.

FIG. 26 is a close-up view of the mobile computing device 200 of FIG. 25 showing the first view 282 of the operation of the computing application. In this view the three-dimensional animated character 268 is pointing and turning to its right. FIG. 27 shows a second view 286 of the computing application wherein the three-dimensional animated character 268 is pointing upward and looking forward. Finally, in FIG. 28, a third view 288 of the computing application is shown wherein the three-dimensional animated character 268 is pointing right and looking down. Various other characters and animations are possible.

Turning now to FIG. 29, a method of generating a customized three-dimensional animation is described in a flow chart 290. In step 291, a user colors a two-dimensional template image including a two-dimensional character. In step 292, the user positions a mobile device to align the colored two-dimensional template image with a camera of the mobile device. In step 293, an augmented reality computing application is operated.

The augmented reality computing application operates in multiple steps. In step 296, the colored two-dimensional template image is captured. In step 297, the application generates a three-dimensional character based on the two-dimensional character such that the three-dimensional character is colored to correspond to the two-dimensional template image. The three-dimensional character is animated in step 298. Finally, in step 299 the application superimposes the three-dimensional character over images captured through the camera of the mobile device such that the three-dimensional character is included in a user's environment.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for generating an animated sequence comprising:
    an image receiving component, comprising a processor and a memory, that receives an image captured by a camera of a mobile device;
    a 4-D animation generator, comprising a processor and a memory, that generates a three-dimensional animated character based on a two-dimensional character image from a scanned two-dimensional template image; and
    one or more coloring pages having a two-dimensional template configured to receive one or more colored markings printed thereon, the template comprising the two-dimensional character image.

2. The system of claim 1, wherein the image receiving component scans the two-dimensional template to read the two-dimensional template and the one or more colored markings.

3. The system of claim 2, wherein the 4-D animation generator processes the two-dimensional template and the one or more colored markings to generate the three-dimensional animated character based on the two-dimensional character image, wherein the three-dimensional animated character is colored to correspond with the one or more colored markings on the two-dimensional character image.

4. The system of claim 1, further comprising a particle effect generator that displays animated effects over a subset of the one or more colored markings on the two-dimensional template such that a particular color corresponds with a particular animated effect.

5. The system of claim 1, further comprising a background image configured to receive colored markings comprising a two-dimensional environment associated with the two-dimensional character image.

6. The system of claim 1, wherein the two-dimensional character image is shown at a perspective with respect to the two-dimensional template such that portions of the front and side of the two-dimensional character are visible.

7. The system of claim 3, wherein the three-dimensional animated character is colored to correspond to the colored two-dimensional template image by coloring nonvisible portions of the two-dimensional character image to match visible portions of the two-dimensional character image.

8. The system of claim 1, wherein the two-dimensional template image is associated with a three-dimensional animation template stored in the memory of the computing application.

9. A method for generating a customized three-dimensional animation comprising:
    coloring in a two-dimensional template image, wherein the two-dimensional template image includes a two-dimensional character image;
    positioning a mobile device to align the colored two-dimensional template image with a camera of the mobile device, wherein the mobile device is executing an augmented reality computing application configured to:
        (1) capture the colored two-dimensional template image with the application;
        (2) generate a three-dimensional animated character based on the two-dimensional character image such that the three-dimensional character is colored to correspond to the colored two-dimensional template image;
        (3) animate the three-dimensional character; and
        (4) superimpose the three-dimensional character over one or more images captured through the camera of the mobile device such that the three-dimensional character is included in a user's environment.

10. The method of claim 9, further comprising selecting, within the application, a source associated with the two-dimensional template image.

11. The method of claim 9, wherein the user's environment includes one or more elements surrounding the mobile device.

12. The method of claim 9, wherein the three-dimensional animated character is colored to correspond to the colored two-dimensional template image by coloring nonvisible portions of the two-dimensional character image to match visible portions of the two-dimensional character image.

13. The method of claim 12, wherein the three-dimensional character is colored white to correspond to non-colored visible portions of the two-dimensional character.

14. A three-dimensional animation kit comprising:
    a coloring book comprising one or more coloring pages, wherein each of the one or more coloring pages comprise a two-dimensional template image corresponding to a three-dimensional animation template of a three-dimensional coloring application, wherein a computing device executing the three-dimensional coloring application is configured to:
        (1) capture an image of a colored two-dimensional template image of the one or more coloring pages, and (2) generate an animated three-dimensional image based on the captured colored two-dimensional template image and the corresponding three-dimensional animation template.

15. The kit of claim 14, wherein the two-dimensional coloring image depicts a character shown at a perspective view with respect to the two-dimensional template page.

16. The kit of claim 15, wherein the character is one of an animal, a person, a machine, and a mythical creature.

17. The kit of claim 14, wherein the three-dimensional animation template specifies actions for the animated three-dimensional image to take.

18. The kit of claim 14, wherein the image of the colored two-dimensional template image is captured automatically in response to a user positioning a mobile device over the colored two-dimensional template image.

19. The kit of claim 14, wherein the computing device is further configured to display a particle effect over portions of the colored two-dimensional template image that are of a special color.

20. The kit of claim 19, wherein the particle effect comprises one or more of a defined visual effect, a defined sound effect, a visual motion sequence effect, and an auditor sequence effect.

* * * * *